(12) United States Patent
Chiu

(10) Patent No.: US 7,610,308 B1
(45) Date of Patent: Oct. 27, 2009

(54) FRAMEWORK FOR CREATING DATABASE APPLICATIONS

(76) Inventor: Kam-Ming Chiu, 2122 Allen Blvd., Apt. 20, Middleton, WI (US) 53562

( * ) Notice: Subject to any disclaimer, the term of this patent is extended or adjusted under 35 U.S.C. 154(b) by 422 days.

(21) Appl. No.: 11/081,293

(22) Filed: Mar. 16, 2005

Related U.S. Application Data

(60) Provisional application No. 60/553,869, filed on Mar. 17, 2004.

(51) Int. Cl.
*G06F 7/00* (2006.01)
(52) U.S. Cl. .................................................. 707/104.1
(58) Field of Classification Search ............... 707/104.1
See application file for complete search history.

(56) References Cited

U.S. PATENT DOCUMENTS

| | | | | | |
|---|---|---|---|---|---|
| 5,065,347 | A | * | 11/1991 | Pajak et al. | 715/835 |
| 5,396,621 | A | * | 3/1995 | MacGregor et al. | 715/809 |
| 5,701,456 | A | * | 12/1997 | Jacopi et al. | 707/4 |
| 2005/0027495 | A1 | * | 2/2005 | Matichuk | 703/2 |

* cited by examiner

*Primary Examiner*—Charles Rones
*Assistant Examiner*—Fazlul Quader
(74) *Attorney, Agent, or Firm*—Craig A. Fieschko, Esq.; DeWitt Ross & Stevens S.C.

(57) ABSTRACT

A framework for creating database applications includes a framework upon which a database application is built. The framework for creating database applications includes the capabilities to construct conditional statements using flowcharts and perform database queries using flowcharts. The framework also provides enhanced sorting capability and has a user friendly and intuitive data organization theme.

19 Claims, 23 Drawing Sheets

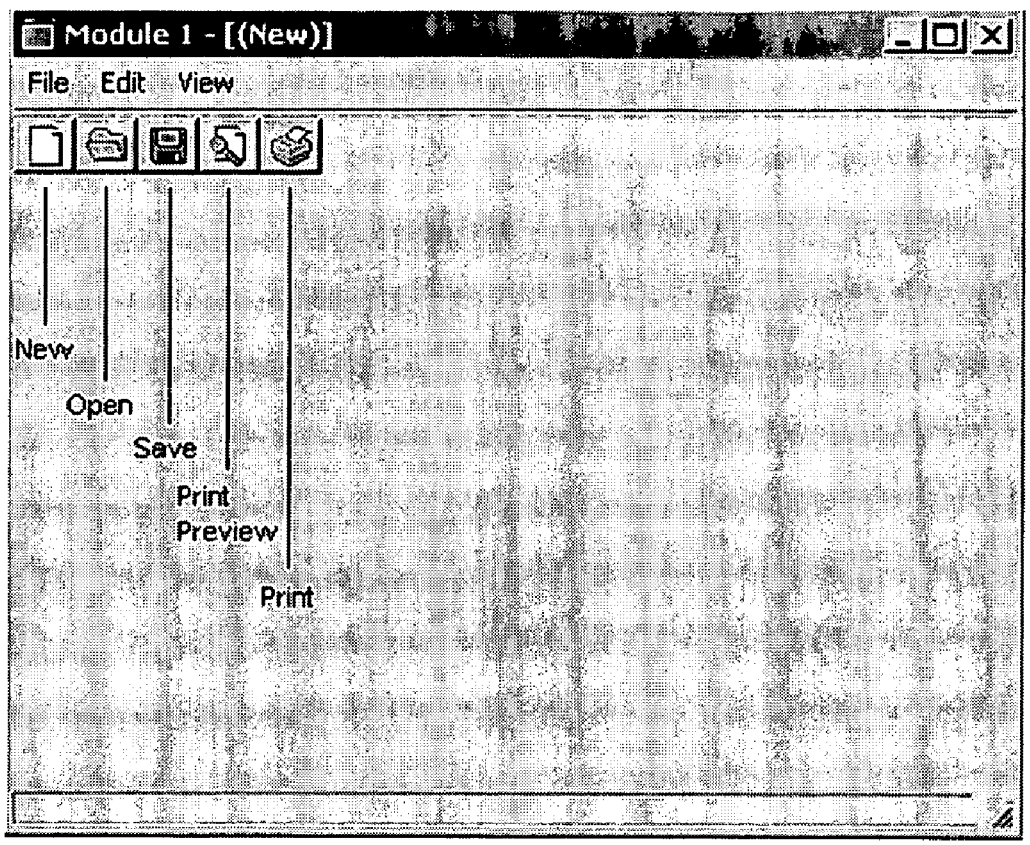
Figure 1
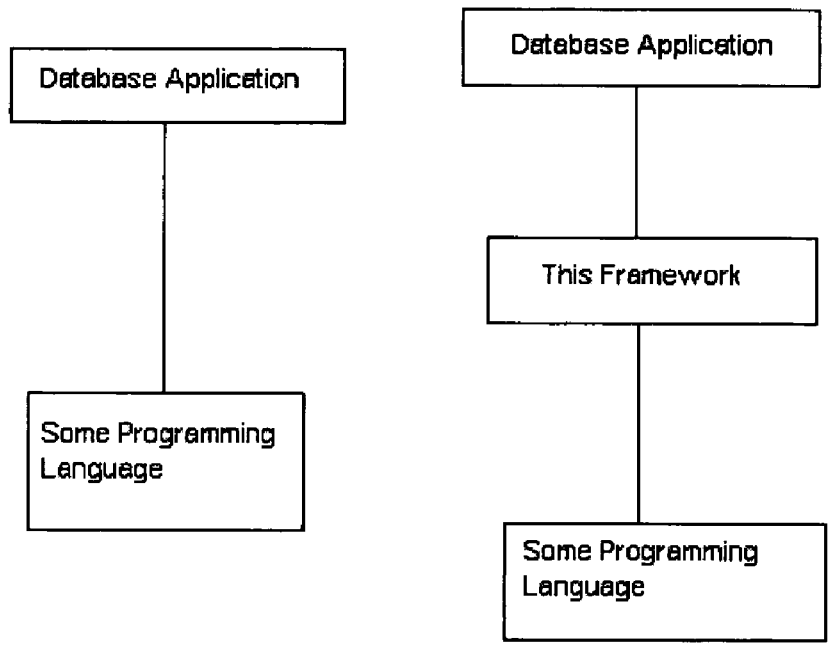
Figure 2A
Figure 2B

```
If ....... A ....... Then
        If ....... C ....... Then
                If ...... E ....... Then
                ElseIf ....... F ....... Then
                Else
                End If
        ElseIf ....... D ....... Then
        Else
        End If
ElseIf ....... B ....... Then
Else
End If
```
Figure 5
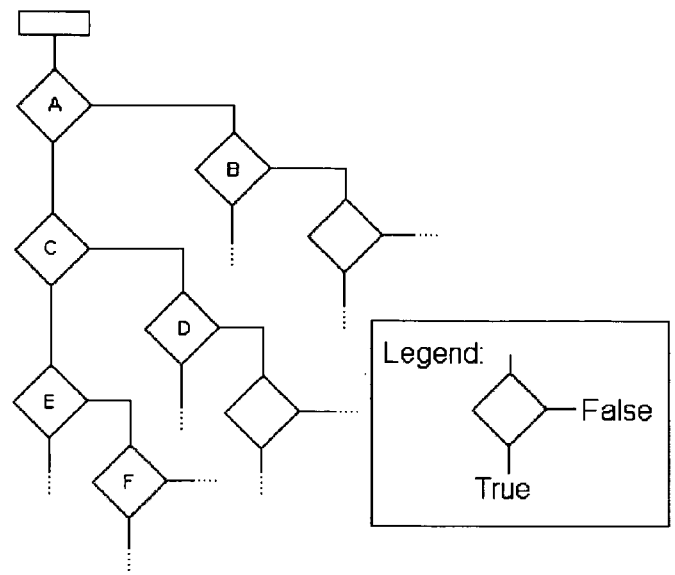
Figure 6
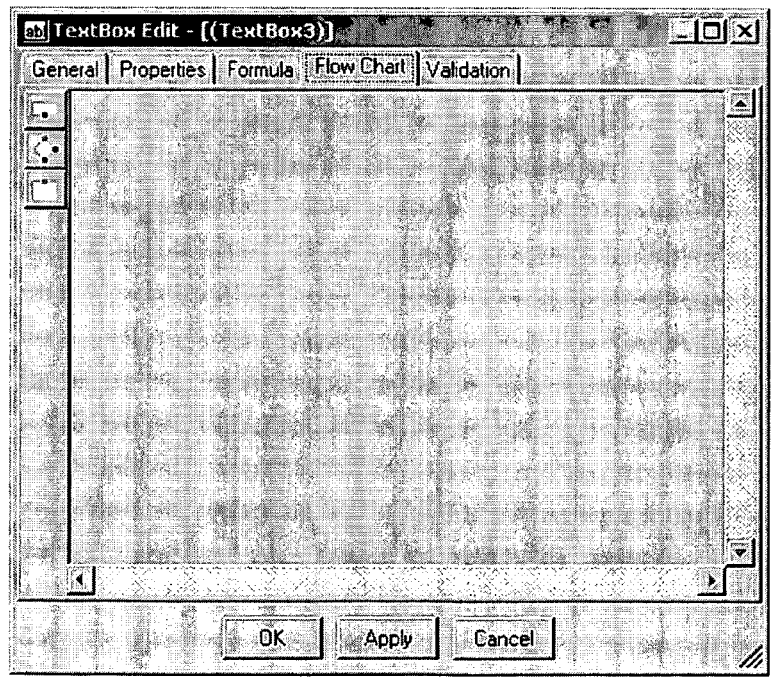
Figure 7

| Customer | Name | Address | City | State | Zip |
|---|---|---|---|---|---|
| 61 | Old World Delicatessen | 2743 Bering St. | Anchorage | AK | 99508 |
| 51 | Let's Stop N Shop | 87 Polk St.Suite 5 | San Francisco | CA | 94117 |
| 77 | Save-a-lot Markets | 187 Suffolk Ln. | Boise | ID | 83720 |
| 84 | The Cracker Box | 55 Grizzly Peak Rd. | Butte | MT | 59801 |
| 71 | Rattlesnake Canyon Gro... | 2817 Milton Dr. | Albuquerque | NM | 87110 |
| 38 | Great Lakes Food Market | 2732 Baker Blvd. | Portland | OR | 97202 |
| 83 | The Big Cheese | 89 Jefferson WaySuite 2 | Portland | OR | 97201 |
| 42 | Hungry Coyote Import St... | City Center Plaza516 Main St. | Elgin | OR | 97827 |
| 54 | The Big Cheese | 89 Chiaroscuro Rd. | Portland | OR | 97219 |
| 88 | Trail's Head Gourmet Pro... | 722 DaVinci Blvd. | Kirkland | WA | 98034 |
| 49 | Lazy K Kountry Store | 12 Orchestra Terrace | Walla Walla | WA | 99362 |
| 95 | White Clover Markets | 305 - 14th Ave. S.Suite 3B | Seattle | WA | 98128 |
| 81 | Split Rail Beer & Ale | P.O. Box 555 | Lander | WY | 82520 |

13 Customer filtered in.  Complex Sort Mode  State

Figure 42

| Customer | Name | Address | City | State | Zip |
|---|---|---|---|---|---|
| 61 | Old World Delicatessen | 2743 Bering St. | Anchorage | AK | 99508 |
| 51 | Let's Stop N Shop | 87 Polk St.Suite 5 | San Francisco | CA | 94117 |
| 77 | Save-a-lot Markets | 187 Suffolk Ln. | Boise | ID | 83720 |
| 84 | The Cracker Box | 55 Grizzly Peak Rd. | Butte | MT | 59801 |
| 71 | Rattlesnake Canyon Gro... | 2817 Milton Dr. | Albuquerque | NM | 87110 |
| 42 | Hungry Coyote Import St... | City Center Plaza516 Main St. | Elgin | OR | 97827 |
| 54 | The Big Cheese | 89 Chiaroscuro Rd. | Portland | OR | 97219 |
| 38 | Great Lakes Food Market | 2732 Baker Blvd. | Portland | OR | 97202 |
| 83 | The Big Cheese | 89 Jefferson WaySuite 2 | Portland | OR | 97201 |
| 88 | Trail's Head Gourmet Pro... | 722 DaVinci Blvd. | Kirkland | WA | 98034 |
| 95 | White Clover Markets | 305 - 14th Ave. S.Suite 3B | Seattle | WA | 98128 |
| 49 | Lazy K Kountry Store | 12 Orchestra Terrace | Walla Walla | WA | 99362 |
| 81 | Split Rail Beer & Ale | P.O. Box 555 | Lander | WY | 82520 |

13 Customer filtered in.  Complex Sort Mode  State->City

Figure 43

| Customer | Name | Address | City | State | Zip |
|---|---|---|---|---|---|
| 61 | Old World Delicatessen | 2743 Bering St. | Anchorage | AK | 99508 |
| 51 | Let's Stop N Shop | 87 Polk St.Suite 5 | San Francisco | CA | 94117 |
| 77 | Save-a-lot Markets | 187 Suffolk Ln. | Boise | ID | 83720 |
| 84 | The Cracker Box | 55 Grizzly Peak Rd. | Butte | MT | 59801 |
| 71 | Rattlesnake Canyon Gro... | 2817 Milton Dr. | Albuquerque | NM | 87110 |
| 42 | Hungry Coyote Import St... | City Center Plaza 516 Main St. | Elgin | OR | 97827 |
| 38 | Great Lakes Food Market | 2732 Baker Blvd. | Portland | OR | 97202 |
| 83 | The Big Cheese | 89 Jefferson Way Suite 2 | Portland | OR | 97201 |
| 54 | The Big Cheese | 89 Chiaroscuro Rd. | Portland | OR | 97219 |
| 88 | Trail's Head Gourmet Pro... | 722 DaVinci Blvd. | Kirkland | WA | 98034 |
| 95 | White Clover Markets | 305 - 14th Ave. S.Suite 3B | Seattle | WA | 98128 |
| 49 | Lazy K Kountry Store | 12 Orchestra Terrace | Walla Walla | WA | 99362 |
| 81 | Split Rail Beer & Ale | P.O. Box 555 | Lander | WY | 82520 |

13 Customer filtered in. | Complex Sort Mode | State->City->Name

Figure 44

| Customer | Name | Address | City | State | Zip |
|---|---|---|---|---|---|
| 61 | Old World Delicatessen | 2743 Bering St. | Anchorage | AK | 99508 |
| 51 | Let's Stop N Shop | 87 Polk St.Suite 5 | San Francisco | CA | 94117 |
| 77 | Save-a-lot Markets | 187 Suffolk Ln. | Boise | ID | 83720 |
| 84 | The Cracker Box | 55 Grizzly Peak Rd. | Butte | MT | 59801 |
| 71 | Rattlesnake Canyon Gro... | 2817 Milton Dr. | Albuquerque | NM | 87110 |
| 42 | Hungry Coyote Import St... | City Center Plaza 516 Main St. | Elgin | OR | 97827 |
| 38 | Great Lakes Food Market | 2732 Baker Blvd. | Portland | OR | 97202 |
| 54 | The Big Cheese | 89 Chiaroscuro Rd. | Portland | OR | 97219 |
| 83 | The Big Cheese | 89 Jefferson Way Suite 2 | Portland | OR | 97201 |
| 88 | Trail's Head Gourmet Pro... | 722 DaVinci Blvd. | Kirkland | WA | 98034 |
| 95 | White Clover Markets | 305 - 14th Ave. S.Suite 3B | Seattle | WA | 98128 |
| 49 | Lazy K Kountry Store | 12 Orchestra Terrace | Walla Walla | WA | 99362 |
| 81 | Split Rail Beer & Ale | P.O. Box 555 | Lander | WY | 82520 |

13 Customer filtered in. | Complex Sort Mode | State->City->Name->Address

Figure 45

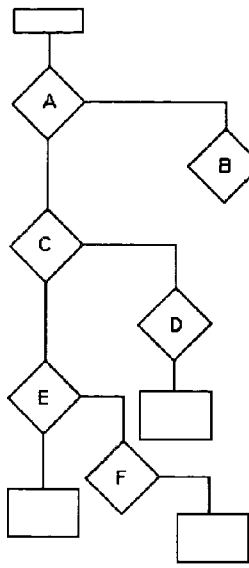
Figure 46
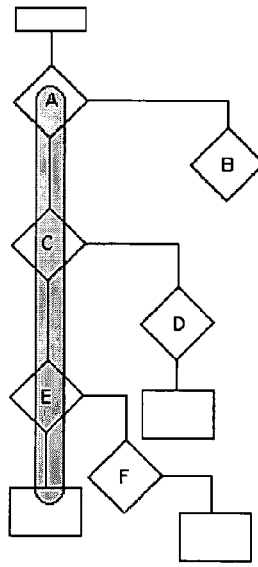
Figure 47
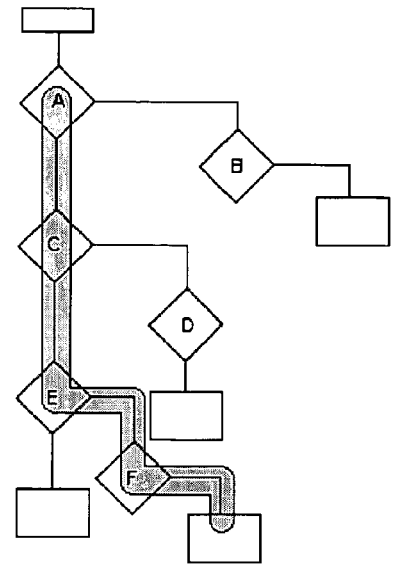
Figure 48
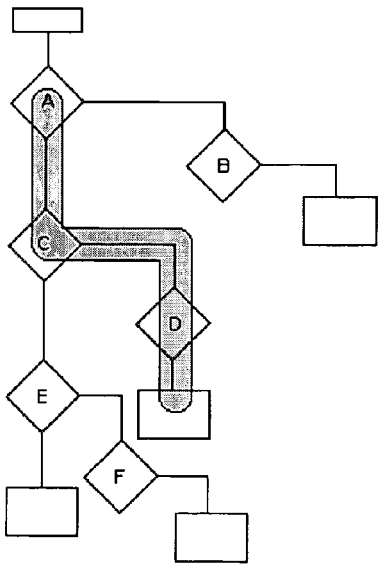
Figure 49
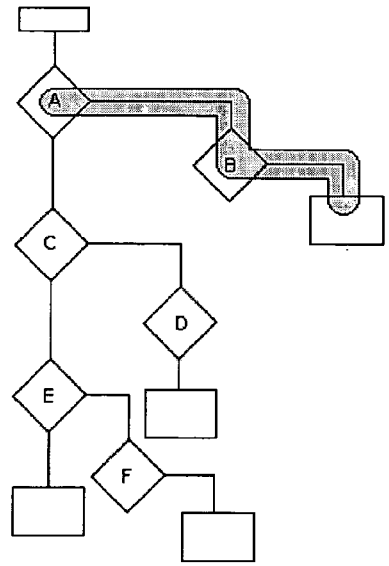
Figure 50
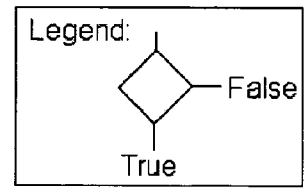

FRAMEWORK FOR CREATING DATABASE APPLICATIONS

CROSS-REFERENCE TO RELATED APPLICATIONS

This is a utility patent application having priority from provisional application No. 60/553,869 filed on Mar. 17, 2004

BACKGROUND OF THE INVENTION

1. Field of the Invention

The present invention relates generally to the field of database application programming and more specifically to a framework for creating database applications.

2. Discussion of the Prior Art

Database applications used in organization can be broadly categorized into two kinds. There are those custom written to tailor to the needs of an organization. And then there are those that are existing packages available in the market written for particular industries. The former will suit the needs of the organization but will generally involve substantial development cost and time. The latter will be more affordable but generally will not be able to adapt totally to the needs of an organization. These kinds of pre-package software however, are fairly common. The most common type of these applications is probably general accounting and management program. Examples are Peach Tree, Quick Books, Microsoft Great Plains, epicor . . . to name a few. These accounting programs are good for their purpose but are generally inadequate to meet the need of the whole organization. The problem with these kinds of accounting programs is that it has limited capability to be customized and it is difficult if not impossible to integrate with other applications. Since accounting is but only one aspect of the business functions needed in an organization, these general accounting program cannot address all the data management needs of an organization. An organization that uses a disparage number of programs that are unable to communicate with each other will be inefficient. To overcome this limitation, many of these accounting packages supplement their programs with different modules. Using Great Plains as an example, besides their core modules, Great Plains offer a variety of 'series' geared towards different industries (such as the distribution series, manufacturing series, project series . . . etc.) Other software packages that offer a suite of modules include Microsoft Solomon, Best, epicor and Oracle E-Business Suite . . . etc.

The ability of a database application to integrate all the business function of an organization is beneficial and hence many database applications provide some sort of customization ability. For e.g. The Mas90, Mas200 and Mas500 of Best software provide a 'Customizer', allowing a user to customize the application to a certain extent. In the case of Microsoft Solomon, provision of customization is achieved using a 'Customization Manager'. Similar to the 'Customizer' in Mas 90, 200 and 500, the 'Customization Manager' provides only a limited degree of customization such as adding simple control such as textbox or changes some appearance settings. There are, however, other softwares that provide customization by exposing the customization to a programming language like VBA (Visual Basic for Application). Examples are Microsoft Great Plains, Microsoft Solomon and epicor. epicor provides a 'Visual Forms Designer' coupled with a 'Customization Workbench' for customization. Conceivably, this approach can produce more sophisticated customizations with respect to the custom functions and features, due to the versatility of the programming language. It does not, however, have enough capabilities to create or modify an entire application using just the tools of these applications, such as 'Customizer', 'Customization Manager' or 'Customization Workbench' . . . etc. This provision of customization only marginally increases the adaptability of the application because it does not address the nature of its inflexibility in a fundamental way; namely, the core functions and features of these applications are hard coded.

Another characteristic of these programs is the way data are organized and presents to a user. These database applications share a general approach in their data management in that the organization has no relevance to everyday common experience in relation to a traditional office environment that use paper document, folders and file cabinet. This lack of correlation to a real life experience means that each of these programs have its own unique way of grouping data and its own unique way to access them. As a result, users of these programs will need to spend time to gain the necessary fluency to perform many of the common tasks needed in a data management program, such as the knowledge in how to 'drill down' or 'drill around' to navigate to the right document location.

The above discussion shows that there are certain areas in existing database applications software available in the market that can be improved on. This framework will address these shortcomings.

SUMMARY OF THE INVENTION

There is a large variety of database application software written for different business and industries. Despite the diverse nature of this program, a close examination reveals that these programs all share some commonalities. For example, they all manage data of some kind, such as raw data capture, data process and manipulation. They all store data in some kind of database so that it can be retrieved later when needed. They all provide some kind of capabilities to analyze these data and present it in some sort of format for viewing or printing. These are common features and functions that are shared across these different applications. This framework therefore provides a standard set of functions to realize these common requirements, such as New, Open, Save, Print Preview, Print . . . etc. FIG. 1 and generalize all the application-specific function and features into a set of abstract features that can be dynamically configured, using the tools provided in the framework.

Once these application-specific functions and features are identified, the next step is to generalize it into a framework so that it can provide a base in which general database applications can be created on. This is in contrast with traditional database applications in which the application is written directly with programming languages (such as C, C++, Java, Visual Basic, Dephi). FIGS. 2A and 2B. The introduction of another layer between a programming language and the application essentially shields the application from the complexity of code, enabling future modification, enhancement or the addition of totally new modules to be performed easily and dynamically, using the framework that created the application in the first place. It also means that all the modules and all the functions in the framework are tightly integrated. Note that the ability to create an entire database application as opposed to the partial customization provided by some of the existing database program as discussed in the last section is the crux of this framework.

The need to devise mechanisms that have scope broad enough to accommodate all these functions and features so that it can be configured dynamically to create an entire application, without the benefit of prior knowledge of what features and functions the application requires is the challenge of this invention. Dynamically means that the implementation of the mechanisms is performed after the software (framework) is installed, either programmatically or by a user. In other words the mechanism cannot be hard coded. In the process, two mechanisms are employed to accomplish certain tasks that are frequently needed in writing a program, namely, realization of conditional statements such as If . . . Else . . . . End If and performing query against a database. The framework equivalent of the former is the use of flowcharts to realize logical conditions (such as If . . . Then . . . End If). The framework equivalent of the latter is the use of flowcharts as alternatives to the 'WHERE' clause of the SQL SELECT statements.

Besides introducing a layer (the framework) between the code and a database application program to gain the benefit of abstraction, this framework also distinguish itself from traditional database applications in its user interface and the way data are organized. The main user interface of the framework resembles a Windows desktop. Windows is a registered trademark of Microsoft Corporation. On it lays several icons, among which is a 'File Cabinet' icon. FIG. 3. The 'File Cabinet' icon is the access point to a file cabinet metaphor of the framework. It has the structural resemblance of a real life file cabinet (a tree structure) and is therefore a logical place where data can be organized, presented and analyzed. When the 'File Cabinet' or any of its folders (and recursively any of its folders . . . ) are double clicked, a new window will open, representing the content of the folder. FIG. 4. The organization of data in a file cabinet metaphor enhances a user's experience because of its close correlation to a real file cabinet and its emphasis on the object-oriented nature of the data, allowing data to be grouped in a meaningful manner. For example, in an accounting application, there can be a folder called Customer File that contains a folder for each customer. Inside each of these folders will contain all the information related to the particular customer such as a folder that contains all the invoices of the customer, a folder that contains all the purchase orders of the customer and a folder that contains all the credit memo of the customer . . . etc. This file cabinet metaphor, though common among operating systems, is unique among database application program. This is in contrast to typical database applications in that data are organized in a proprietary manner and hence users have to learn how to navigate to the right documents due to its arbitrariness.

BRIEF DESCRIPTION OF THE DRAWINGS

FIG. 1 is a screen shot of a blank module

FIG. 2 is a diagram showing the architectural difference between traditional database applications and database application created from this framework. FIG. 2A shows traditional database applications written directly from some programming language. FIG. 2B shows database application configured using this framework, which serves as a layer between database applications and some programming language, hence isolating the database applications from the complexity of the programming code.

FIG. 5 is the general structure of a conditional statement showing a multitude of nested conditions.

FIG. 6 is a flowchart of a logical equivalent of the conditional statement in FIG. 5, showing a plurality of logic unit nodes connected in a manner that realizes the condition in FIG. 5.

FIG. 7 is a screen shot of a window for constructing a flowchart to realize a condition. This example shows the provision for constructing a flowchart in a TextBox Edit dialog box, allowing the value in the corresponding textbox to be dependent on some kind of condition.

FIG. 38 is a screen shot of a folder of customers showing a plurality of customer files.

FIG. 39 is a screen shot of a filter window showing all the customer files has been filtered.

FIG. 40 is a screen shot of a folder window after clicking on a sort mode toggle button to display the option of a simple or complex sort.

FIG. 41 is a screen shot of a filter window after clicking on a sort mode toggle button to display the option of a simple or complex sort.

FIG. 42 is a screen shot of a filter window after alphabetically sorting the state of each customer.

FIG. 43 is a screen shot of a filter window after alphabetically sorting cities within the same state.

FIG. 44 is a screen shot of a filter window after alphabetically sorting the names of the customer within the same city.

FIG. 45 is a screen shot of a filter window after alphabetically sorting the addresses of the customer within the same customer name.

FIG. 46 shows a flowchart that is logically equivalent to the following conditional statement:

```
If . . . A . . . Then
    If . . . C . . . Then
        If . . . E . . . Then
        ElseIf . . . F . . . Then
        End If
    ElseIf . . . D . . . Then
    End If
ElseIf . . . B . . . Then
End If
```

FIG. 47 shows a path (the gray strip) trace out by the algorithm as the flowchart is run. The logic corresponding to this path is A AND C AND E FIG. 48 shows another path (the gray strip) trace out by the algorithm as the flowchart is run. The logic corresponding to this path is A AND C AND NOT E AND NOT F FIG. 49 shows another path (the gray strip) trace out by the algorithm as the flowchart is run. The logic corresponding to this path is A AND NOT C AND D FIG. 50 shows another path (the gray strip) trace out by the algorithm as the flowchart is run. The logic corresponding to this path is NOT A AND NOT B

DETAIL DESCRIPTION OF THE INVENTION

A flowchart can be used as an alternative mechanism to realize the condition of a conditional statement. An example of a conditional statement is:

```
If . . . Then
ElseIf . . . Then
End If
```

The use of conditional statements in a programming language is common and hence this framework needs to provide a mechanism such that the condition of a conditional statement can be realized. A conditional statement takes the general form of FIG. 5 where A, B, C, D, E, F . . . are Boolean statements that can be evaluated to true or false.

These conditional statements in a programming language are realized by flowcharts within the framework. FIG. 6 shows a flowchart that is logically equivalent to the conditional statement of FIG. 5. These flowcharts are constructed dynamically within the framework. This means that all the information that constituent the flowchart is stored in a database. When the situation arises, the flowchart can be loaded from the database and the programming code[1] behind the flowchart can be run to determine the result so that a value can be returned or an action be taken. There is no restriction in the size and complexity of the flowchart (as long as it is logically consistent). FIG. 7 shows the graphical interface for constructing a flowchart to realize a condition.

Figure 8:
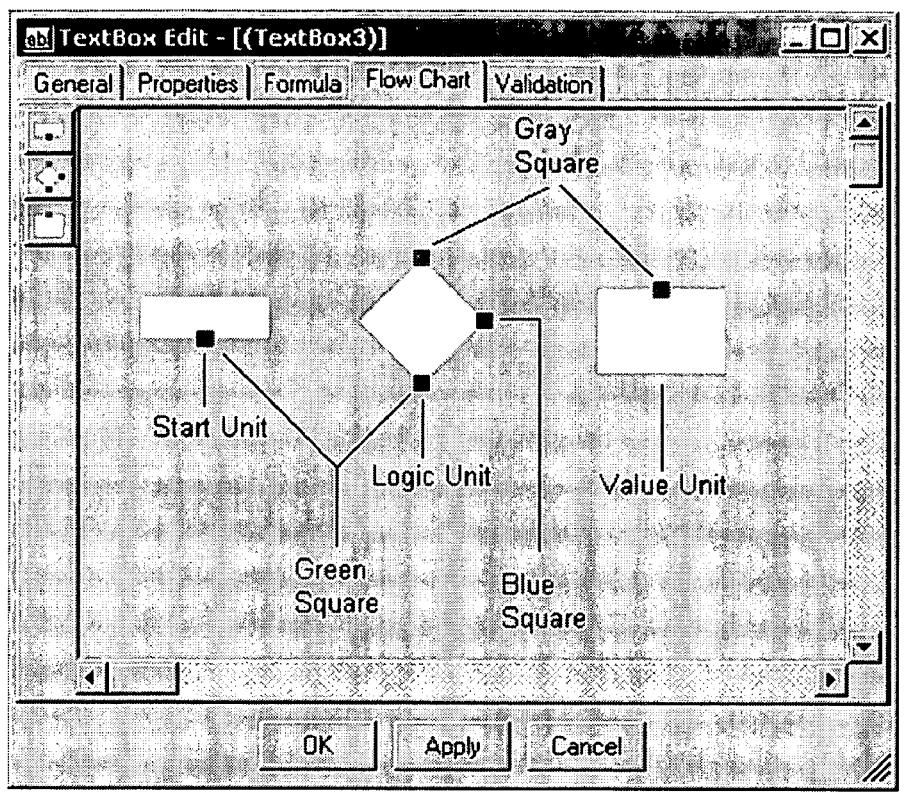
FIG. 8 is a screen shot showing a start unit node, a logic unit node and a value unit node used in constructing a flowchart for realizing a condition.

A flowchart consists of a start unit node, any number of logic unit nodes, and any number of value unit nodes. FIG. 8. The start unit node, logic unit nodes and value unit nodes are connected to each other by connecting lines between their ports. There are three types of ports (one input port and two types of output port), each type is shown with a different color. The input port is the place where the path of the algorithm arrives at a node. This is shown as a gray square. The output port is the place where the path of the algorithm starts from a node. There are two types of output port. One is the Boolean complementary of the other. By convention, the Boolean true port is shown as a green square whereas the Boolean false port is shown as a blue square. The start unit node consists of a true output port and is the place from which the algorithm of the flowchart starts. The logic unit node consists of an input port (gray square), a true output port (green square) and a false output port (blue square). A logic unit node is the place where the logic statement of the node is evaluated. If the statement is evaluated to be true, the algorithm will flow out from the true output port. Conversely if the statement is evaluated to be false, the algorithm will flow out from the false output port. The value unit node consists of an input port (gray square). A value unit node is where the flow of the algorithm for a particular path ends. A value unit node is the place to return a value or to take an action for the flowchart. For example the statement:

```
If . . . A . . . Then
    Do something
End If
``` where A is some kind of condition that can be evaluated to true or false will be realized by the flowchart in FIG. 9. Similarly the statement

```
If ... A ... Then
    Do something
Else
    Do something else
End If
``` where A is some kind of condition that can be evaluated to true or false will be realized by the flowchart in FIG. 10.

Figure 9:
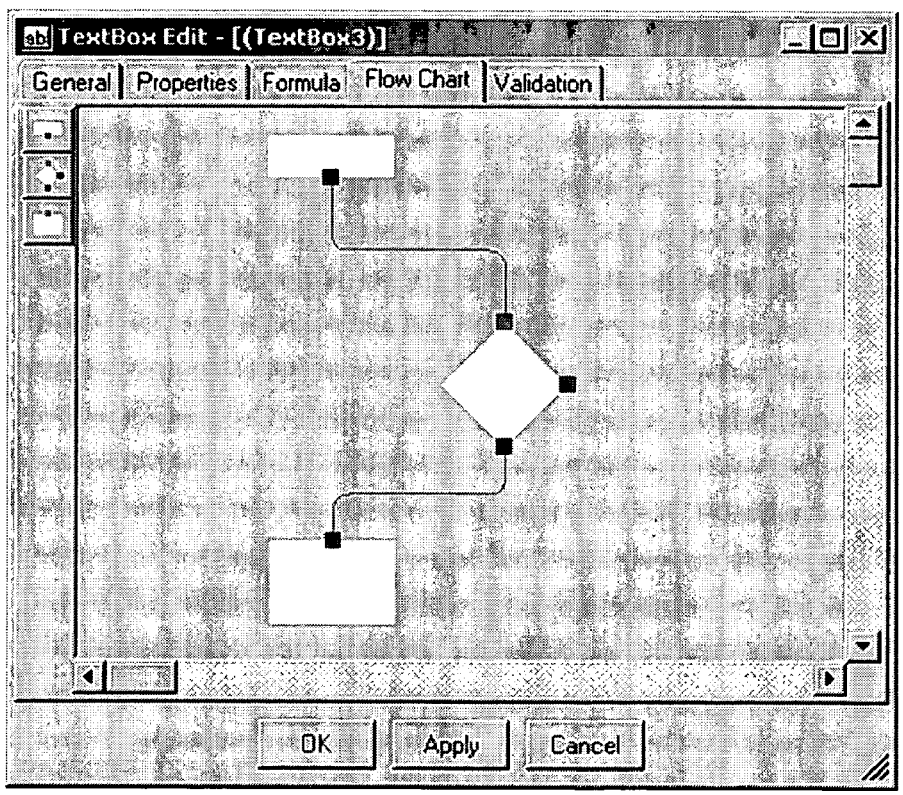
FIG. 9 is a screen shot of a flowchart showing a start unit node, a logic unit node and a value unit node connected together to realize a condition.

FIG. 7 shows the graphical interface for constructing a flowchart. On the left side are three buttons. Clicking on the first button will drop a start unit node onto the panel. Clicking on the second button will drop a logic unit node onto the panel. Clicking on the third button will drop a value unit node onto the panel. These nodes can be moved around on the panel by positioning the cursor over the node and press the mouse down and move the mouse while keeping the mouse down. When an ideal location is reached, release the mouse button and the node will be relocated to the new position. To connect the node, click on an output port and then click on an input port of another node. A line will appear showing the connection. Repeat these procedures until a flowchart is constructed. FIG. 9. Each logic unit node contains a logic statement that can be evaluated to true or false. A logic statement consists of three parts. The left part is a formula. The middle part is a comparator. The right part is a constant.

[Formula] [Comparator] [Constant]

The formula is an algebraic expression of a certain data type that can be evaluated to a constant of that data type. The comparator is a relation operator comparable to the data type of the formula. If the formula data type is string, the list of comparators are "is equal to", "is not equal to", "is larger than", "is smaller than", "is larger than or equal to", "is smaller than or equal to", "contains". If the formula data type is integer, decimal, single or double, the list of comparators are "=", "< >", ">", "<", ">=", "<=". If the formula data type is date, the list of comparators are "is on", "is not on", "is after", "is before", "is on or after", and "is on or before". If the formula data type is a Boolean value, a selection in a combobox or a business object, the list of comparator is "is." The constant is a particular value of that formula data type. If the formula data type is a string, the constant is a word, such as "Chicago". If the formula data type is integer, decimal, single or double, the constant is a number. If the formula data type is date, the constant is a particular date, such as Mar. 12, 2005. If the formula data type is a business object, the constant is a particular business object, such as a particular invoice, a particular customer . . . etc.

If the formula data type is integer, decimal, single or double, then the formula can have any combination of field values, variables, functions and numbers and arithmetic operators that obey algebraic rules. Field values are values of a field (such as a textbox), for example the number 23, the word "Oregon". Variables are user defined algebraic expression that can be evaluated to a number, for example the variable a where a=b+c and where b and c can in turn be a variable, a function or a number. Functions are algebraic operators that return a number for some inputs, for example, the sum of all the invoice total of a certain customer within a certain period of time. The simplest form of a formula is a single term such as a field value or a function. If the formula is an algebraic expression that contains multiple terms, the data type of each individual term must be a number. The data type of a field value can be a number, a text, a date, a Boolean value of true or false, a selection in a combobox control or a business object such as a particular invoice, a particular customer or an inventory item . . . etc.

Figures 10, 11:
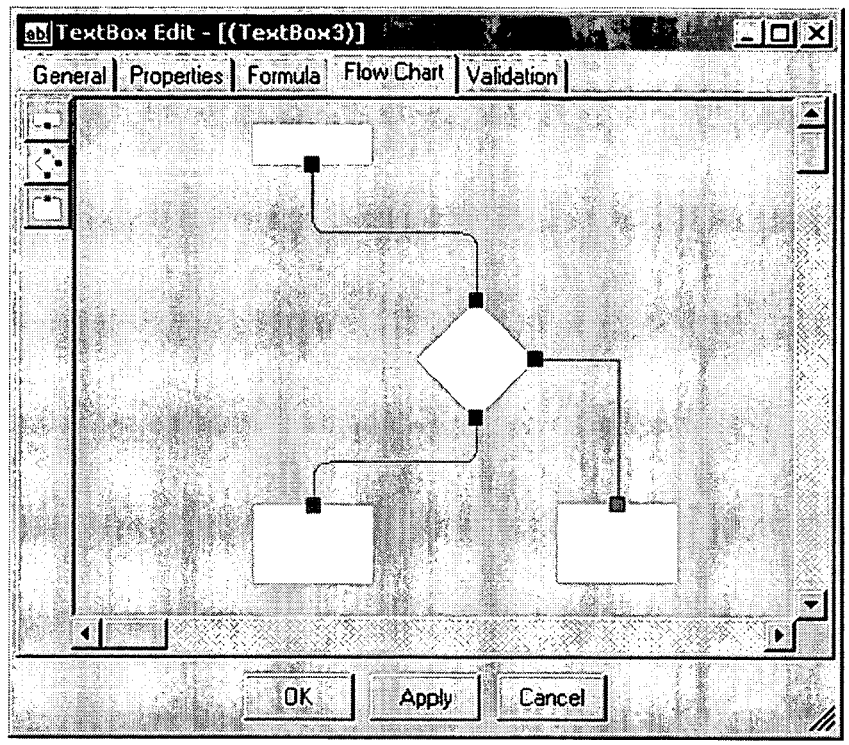
FIG. 10 is a screen shot of a flowchart showing a start unit node, a logic unit node and two value unit nodes connected together to realize a condition.
FIG. 11 is a screen shot of a LogicUnitEdit dialog box after the Field tab of the Formula tab has been clicked.

To implement the logic statement, double click on the logic unit node. A LogicUnitEdit dialog box will appear. FIG. 11. A LogicUnitEdit dialog box is the place to construct the logic statement of a logic unit node. It consists of three tabs. They are Formula, Comparator and Value. The Formula tab provides the tools to construct the formula part of the logic statement. The Comparator tab provides the tools to construct the comparator part of the logic statement. The Value tab provides the tools to construct the formula part of the logic statement.

Figure 12:
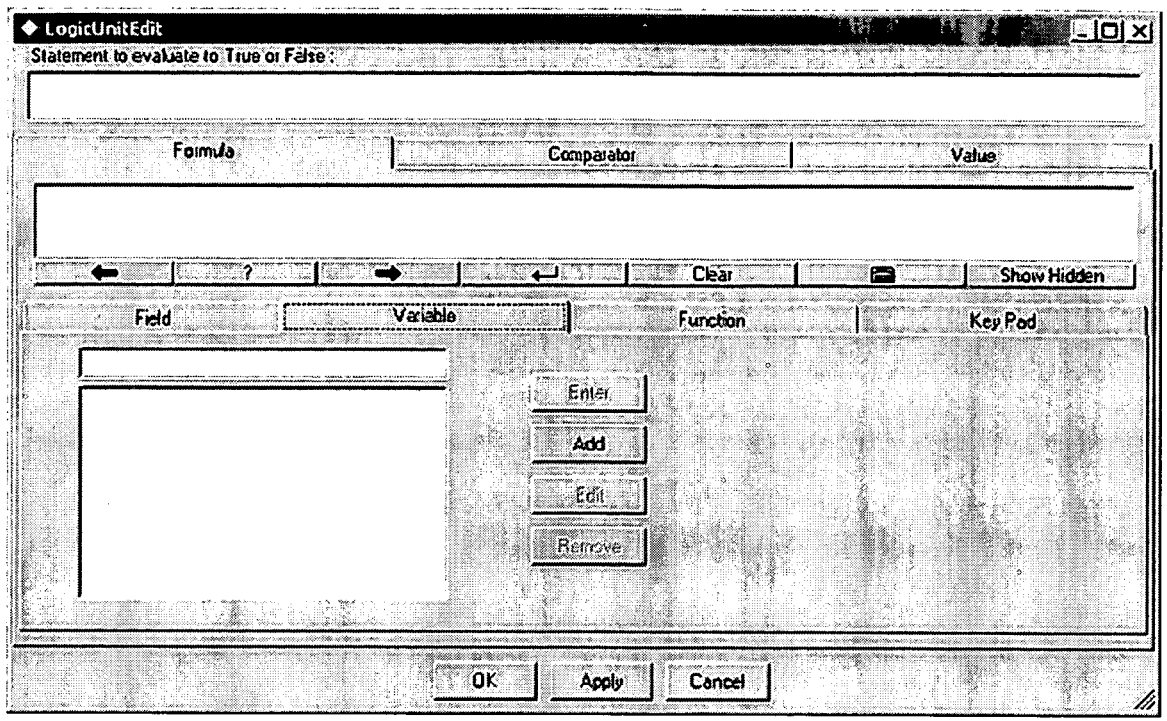
FIG. 12 is a screen shot of a LogicUnitEdit dialog box after the Variable tab of the Formula tab has been clicked.
Figure 13:
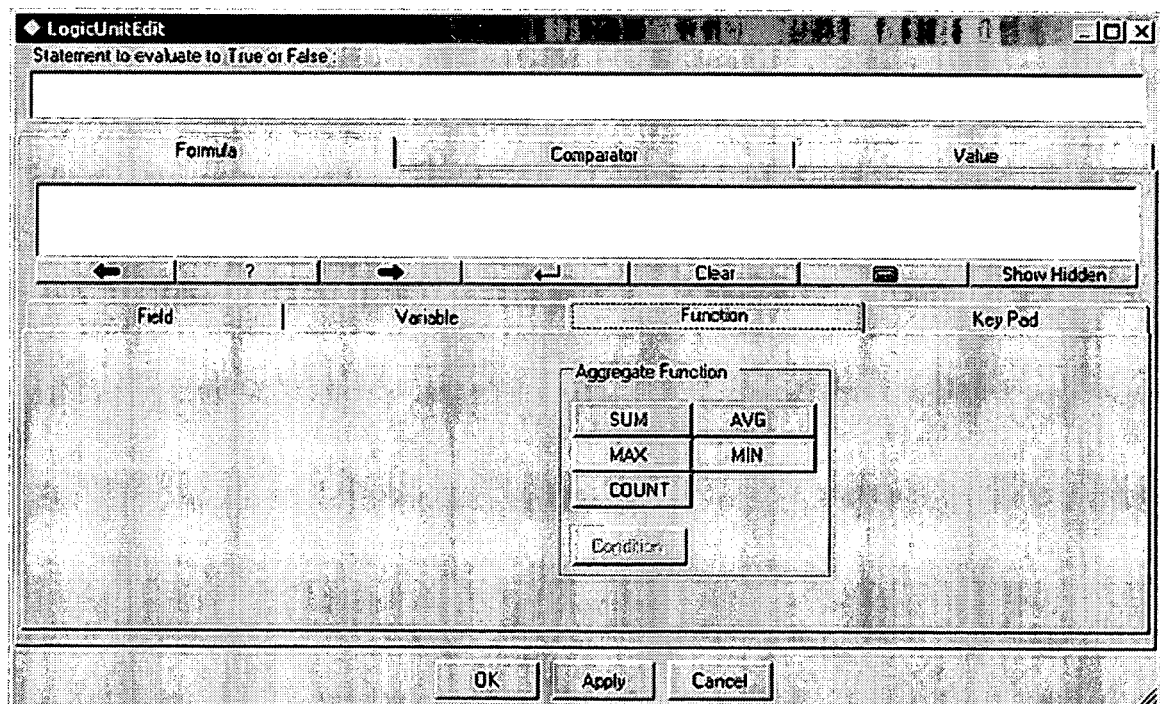
FIG. 13 is a screen shot of a LogicUnitEdit dialog box after the Function tab of the Formula tab has been clicked.
Figure 14:
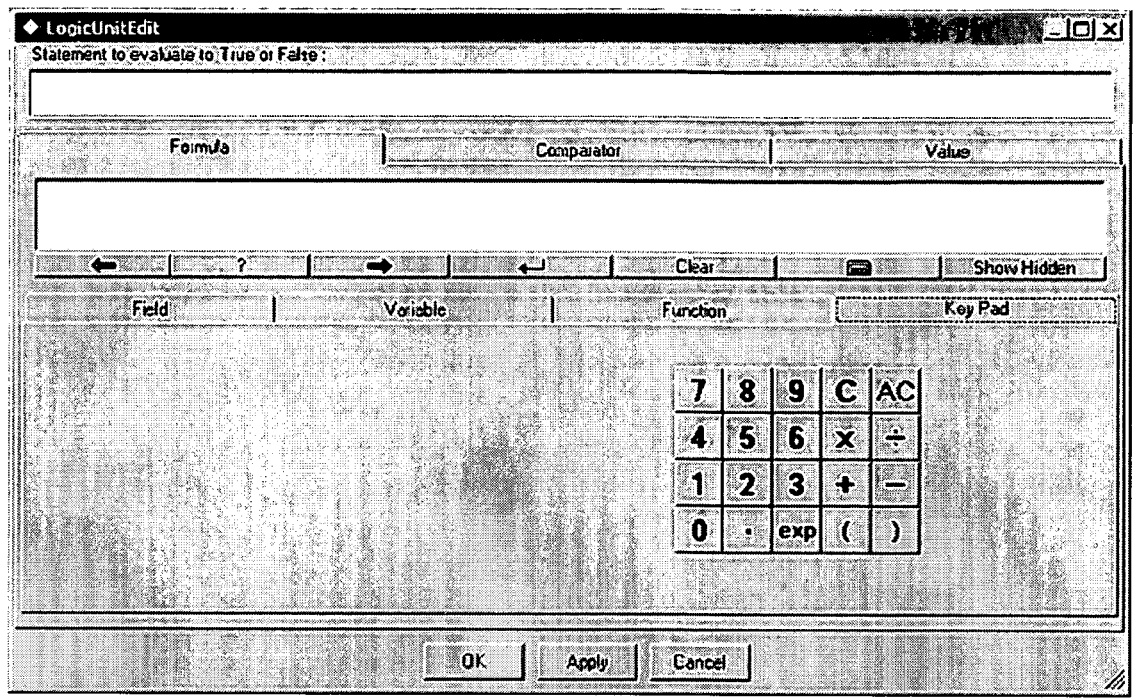
FIG. 14 is a screen shot of a LogicUnitEdit dialog box after the Key Pad tab of the Formula tab has been clicked.

The Formula tab consists of four tabs. They are Field (FIG. 11), Variable (FIG. 12), Function (FIG. 13) and Key Pad (FIG. 14). The Field tab provides the tools to enter fields into the formula. The Variable tab provides the tools to enter variables into the formula. The Function tab provides the tools to enter functions into the formula. The Key Pad tab provides the tools to enter number, parenthesis and arithmetic operators into the formula.

Another kind of operations common in database applications is the retrieval of data from a database. The procedure is to run a SQL SELECT statement against the database. This SQL SELECT statement can be hard coded into a programming language or it can be dynamically constructed for flexibility. Existing applications that has provision to allow a user to dynamically construct a SQL SELECT statement requires the user to be knowledgeable in SQL statement. This is not trivial for selection criteria that are complex; it is also prone to syntax error if the user is not careful. In contrast this framework provides a method (with two variations) to allow a user to dynamically construct criteria to retrieve data from a database in a manner that is intuitive and requires from a user no prior knowledge in the field of database query, even if the selection criteria is complex. Also, by not exposing the SQL statement directly to a user means the elimination of any chance of syntax error from the user.

Figure 15:
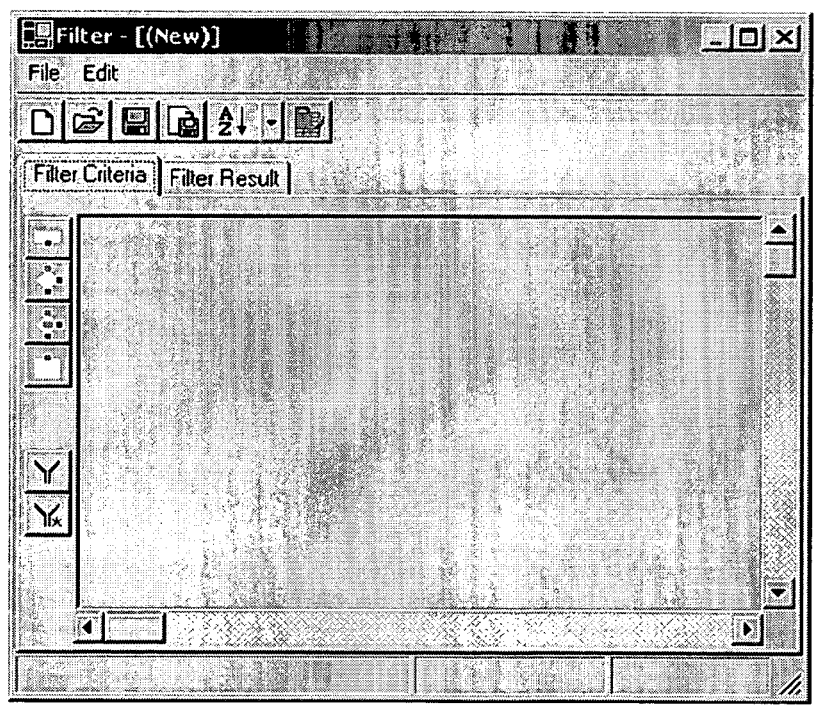
FIG. 15 is a screen shot of a window for constructing a flowchart for filtering records.
Figure 16:
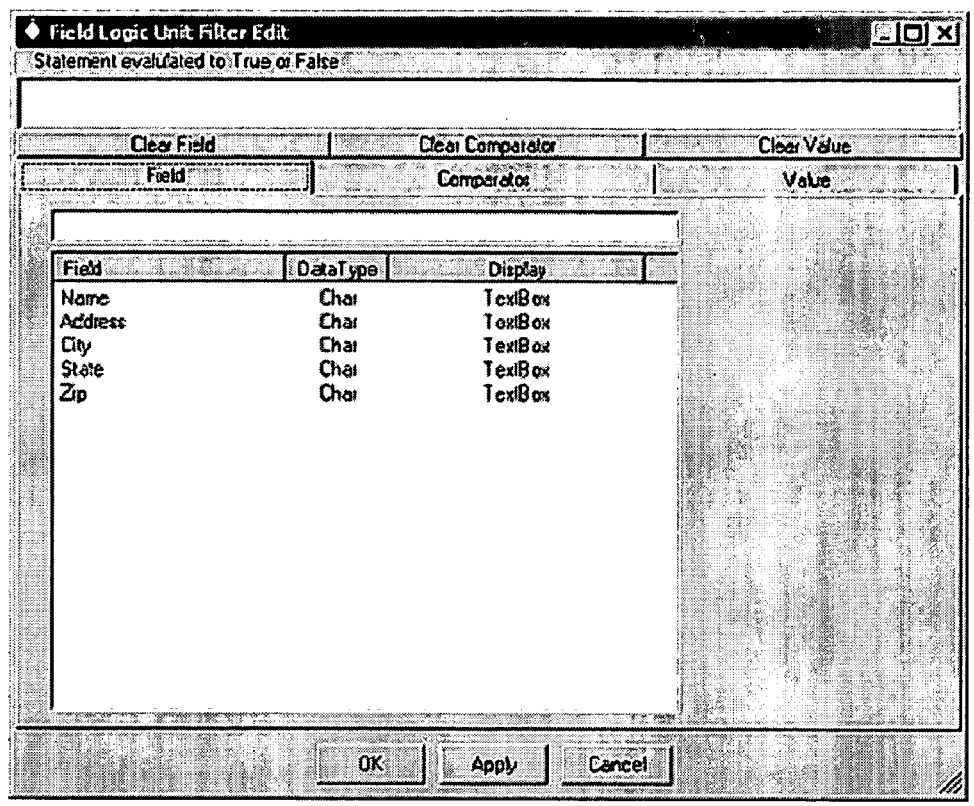
FIG. 16 is a screen shot of a Field Logic Unit Filter Edit dialog box after the Field tab has been clicked.

The method involves the use of flowcharts. A flowchart for filtering records consists of a start unit node, any number of field logic unit nodes, any number of formula logic unit nodes, and any number of end unit nodes. The start unit node is where the algorithm of the flowchart begins. The field logic unit node and the formula logic unit node are decision nodes determining whether the path of the algorithm should flow out of the true output port or the false output port of the node. The end unit node denotes the end of the particular path that connects to it. FIG. 15 shows the interface for constructing a flowchart for filtering records. There are six buttons on the left side. Clicking on the first button will drop a start unit node onto the flowchart. Clicking on the second button will drop a field logic unit node onto the flowchart. Clicking on the third button will drop a formula logic unit node onto the flowchart. Clicking on the fourth button will drop an end unit node onto the flowchart. Clicking on the fifth button will run the flowchart using the first variation of the method. Clicking on the sixth button will run the flowchart using the second variation of the method. The description of the nodes and the construction of the flowchart used in filtering records is exactly the same as the description of the nodes and the construction of the flowchart used in realizing a condition discussed earlier and will not be repeated here. Once the flowchart is constructed, the next step is to set the condition of the flowchart by implementing the logic statement in its field logic unit node(s) and/or the logic statement in its formula logic unit node. To implement the logic statement in the field logic unit node, double click on the field logic unit node to bring up the Field Logic Unit Filter Edit dialog box FIG. 16. To implement the logic statement in the formula logic unit node, double click on the formula logic unit node to bring up the Formula Logic Unit Edit dialog box FIG. 17.

A Field Logic Unit Filter Edit dialog box is the place to construct a logic statement to compare a field value with a constant. A logic statement in the Field Logic Unit Filter Edit dialog box has the general form of

[Field][Comparator][Value]

A Field Logic Unit Filter Edit dialog box consists of a textbox to display the logic statement, three buttons (Clear Field, Clear Comparator, and Clear Value) for clearing the field, the comparator and the constant respectively and three tabs, 'Field', 'Comparator' and 'Value'. The 'Field' tab provides the tools to set the Field Value. The 'Comparator' tab provides the tools to set the comparator. The 'Value' tab provides the tools to set the constant.

The Field tab consists of a textbox and a listview. The listview displays a list of relevant fields. Clicking on an entry in the listview will display the field on the textbox and set the field value in the logic statement. It will also display a list of relevant operators in the listbox of the Comparator tab.

Figure 18:
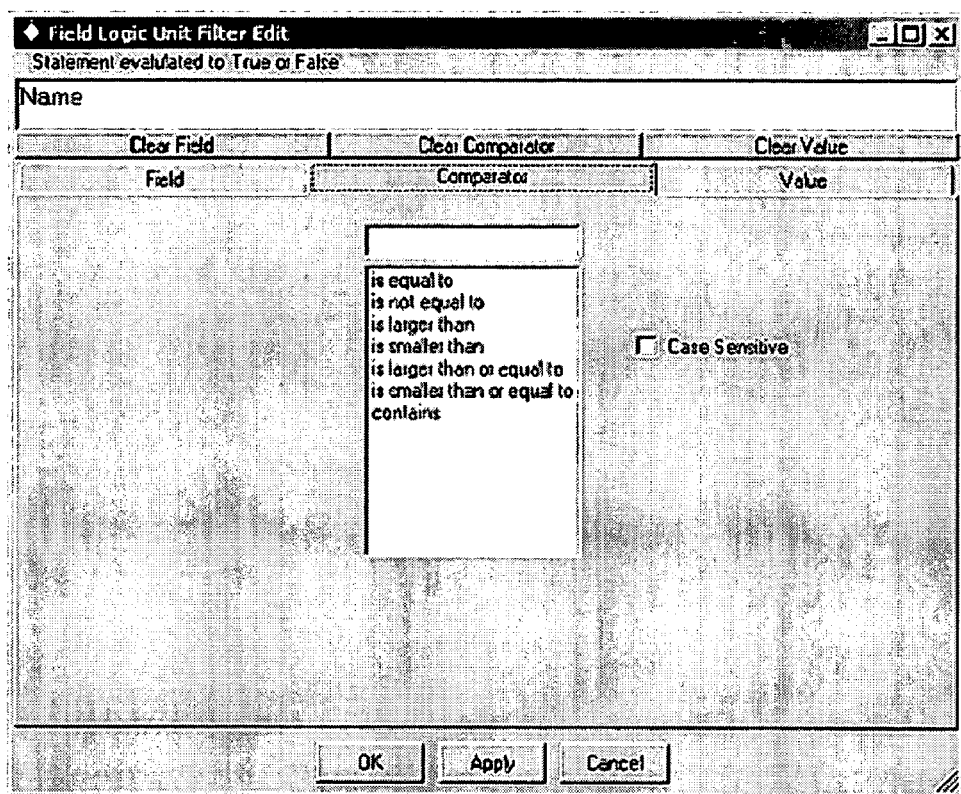
FIG. 18 is a screen shot of a Field Logic Unit Filter Edit dialog box after the Comparator tab has been clicked.

The Comparator tab consists of a textbox, a listbox and a checkbox. FIG. 18. When a field value in the Field tab has been set, a list of relevant operators will be displayed in the listbox of the Comparator tab. If the field value data type is string, the list of operators is "is equal to", "is not equal to", "is larger than", "is smaller than", "is larger than or equal to", "is smaller than or equal to", "contains". Also, the Case Sensitive checkbox will be enabled; allowing a user to determine whether uppercase or lowercase should be taken into consideration. If the field Value data type is integer, decimal, single or double, the list of operators are "=", "o", ">", "<", ">=", "<=". If the field Value data type is date, the list of operators are "is on", "is not on", "is after", "is before", "is on or after", and "is on or before". If the field value data type is a Boolean value, a selection in a combobox or a business object, the list of comparator is "is."

Clicking on an entry in the listbox will display the operator in the textbox and sets the operator in the logic statement.

Figure 19:
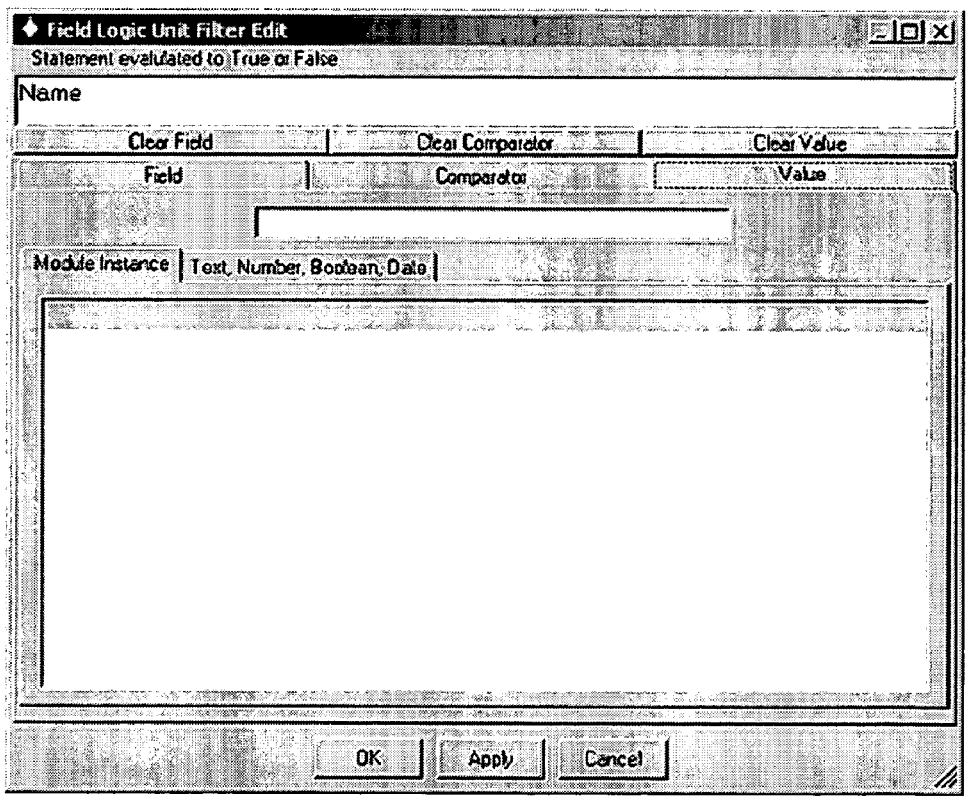
FIG. 19 is a screen shot of a Field Logic Unit Filter Edit dialog box after the Module Instance tab of the Value tab has been clicked.
Figure 21:
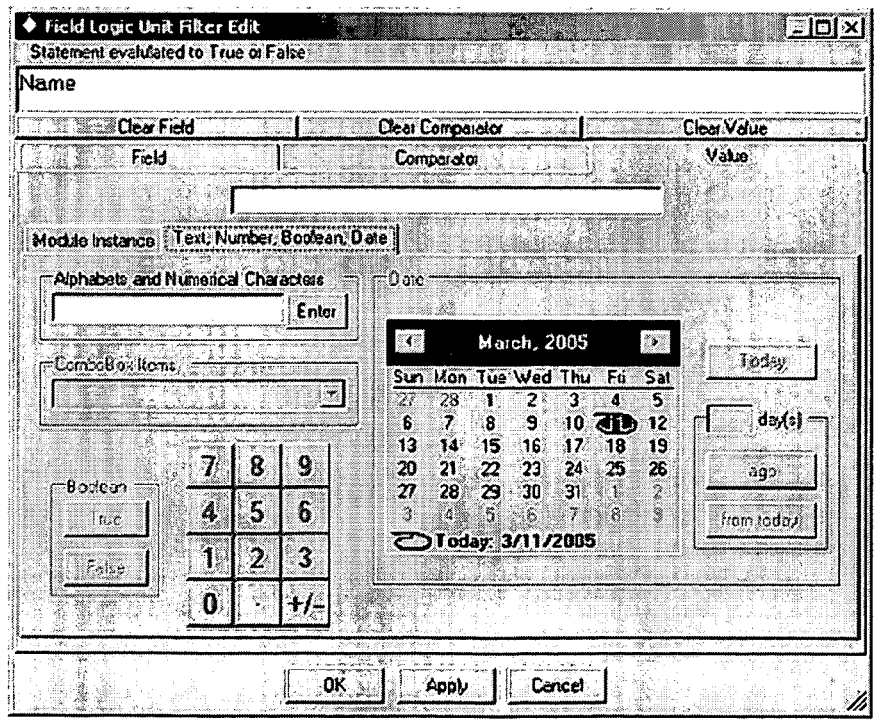
FIG. 21 is a screen shot of a Field Logic Unit Filter Edit dialog box after the Text, Number, Boolean, Date tab of the Value tab has been clicked.

The Value tab consists of two tabs. 'Module Instance' and 'Text, Number, Boolean and Date'. The Module Instance consists of a listview to display a list of relevant business objects, such as a list of customers, a list of invoices, a list of inventory items . . . etc., if the data type of the field value is a business object. FIG. 19. The 'Text, Number, Boolean and Date' tab consists of a textbox for entering a text, a combobox for choosing a value from a list of entries, a key pad to enter a numerical value, a calendar to enter a date value, a 'Today' button to indicate the date at the time when the logic is determined, and a day textbox, a 'ago' and 'from today' button used in conjunction to indicate the date offset by the number of days in the day textbox at the time when the logic is determined. FIG. 21.

Figure 20:
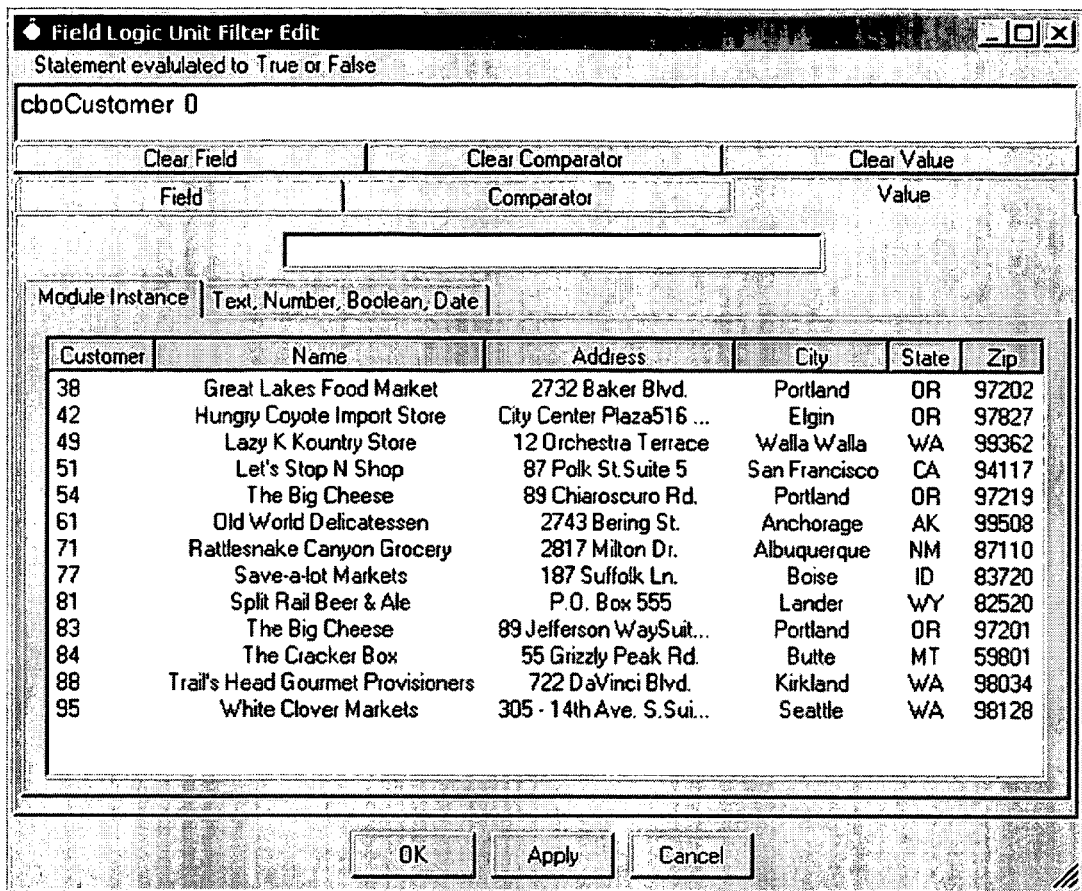
FIG. 20 is a screen shot of a Field Logic Unit Filter Edit dialog box showing a list of business objects (companies) after the Module Instance tab of the Value tab has been clicked.

If the field value is a business object (such as an invoice object, customer object . . . etc), the 'Module Instance' tab will display a list of business objects corresponding to the business object type of the field value as shown in FIG. 20.

The above discussion shows that the logic statement of a field logic unit node allows the comparison of a single field value of various data type (number, text, date, business object . . . etc) to a constant of that data type of the logic statement. There are times when a database application requires comparison between several field values in a module. Hence this framework also allows the comparison between multiple field values of number data type in a module using the formula logic unit node. To construct the logic statement in a formula logic unit node, double click on the formula logic unit node to bring up the Formula Logic Unit Edit dialog box.

A Formula Logic Unit Edit dialog box is the place to construct a logic statement to compare a formula with a constant, which in this case is a number. A logic statement in a Formula Logic Unit Edit dialog box has the general form of

[Formula][Comparator][Value]

where the formula is an algebraic expression containing the field values that can be evaluated to a number, the comparator is >=, <=, >, <, =, < > and value is a number.

Figure 17:
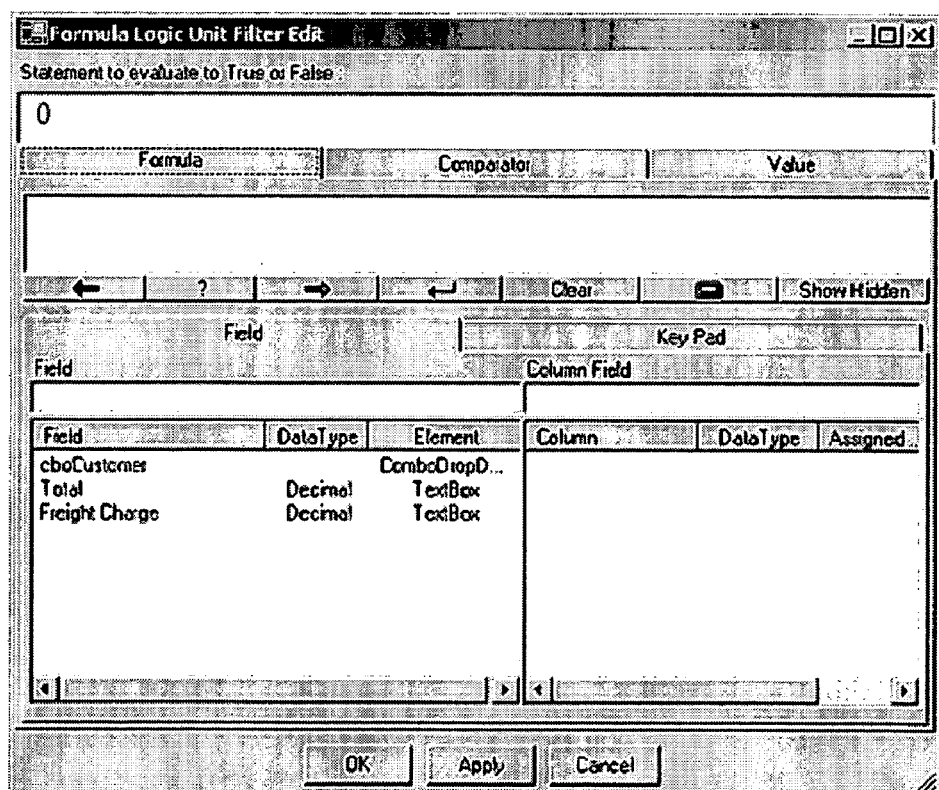
FIG. 17 is a screen shot of a Formula Logic Unit Filter Edit dialog box after the Field tab of the Formula tab has been clicked.
Figure 22:
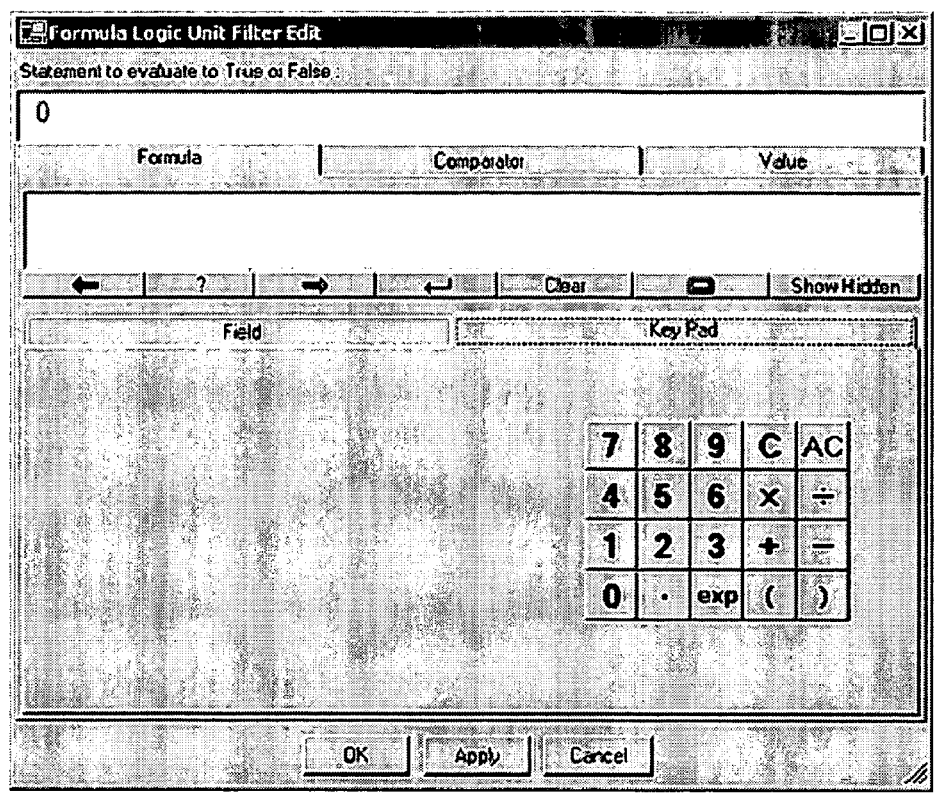
FIG. 22 is a screen shot of a Formula Logic Unit Filter Edit dialog box after the Key Pad tab of the Formula tab has been clicked.
Figure 23:
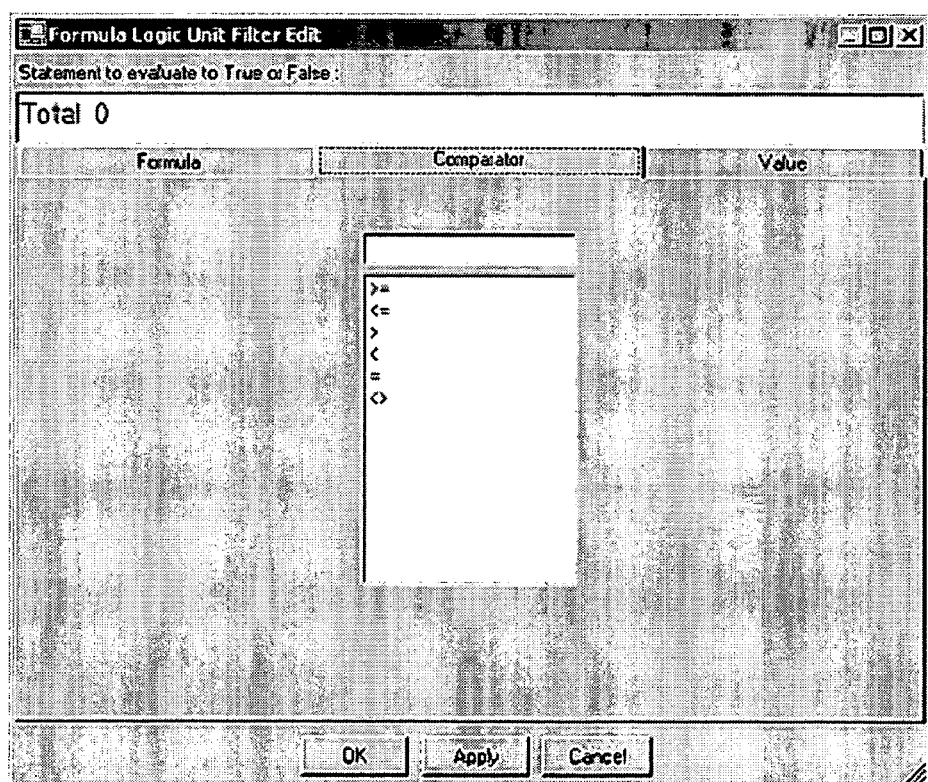
FIG. 23 is a screen shot of a Formula Logic Unit Filter Edit dialog box after the Comparator tab has been clicked.
Figure 24:
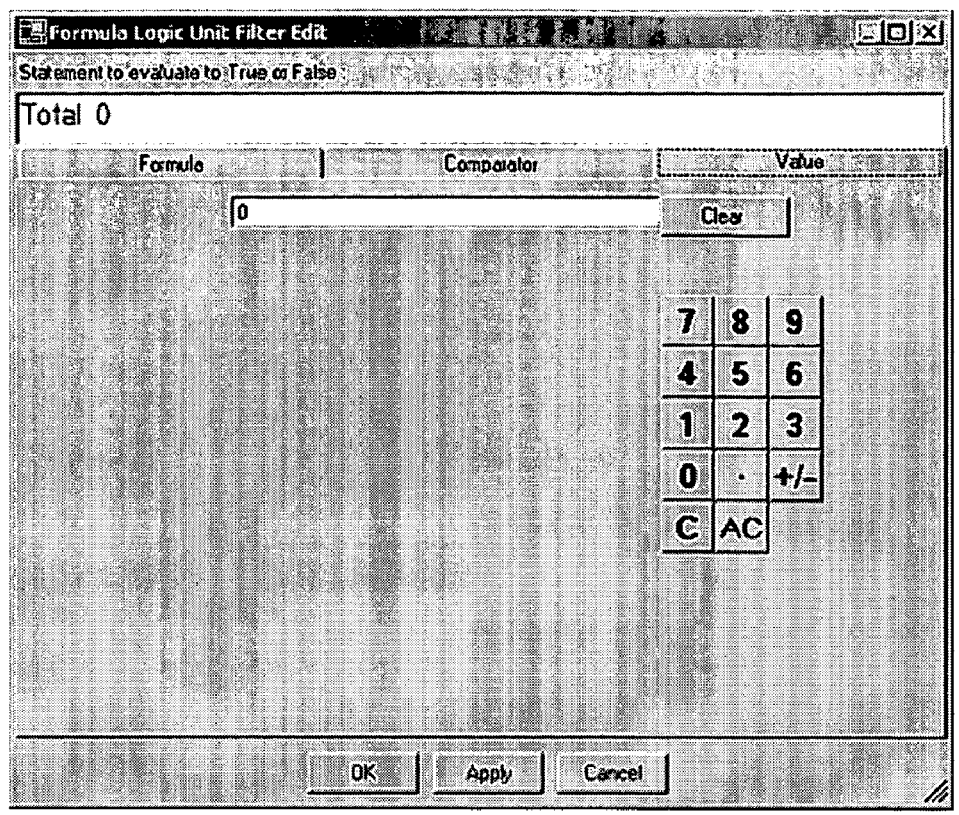
FIG. 24 is a screen shot of a Formula Logic Unit Filter Edit dialog box after the Value tab has been clicked.

A Formula Logic Unit Edit dialog box consists of a textbox to display the logic statement and three tabs, 'Formula', 'Comparator' and 'Value' FIG. 17. The 'Formula' tab provides the tools to enter a formula into the logic statement. It has two tabs, 'Field' and 'Key Pad'. The 'Field' tab is used to enter a field of data type number of the module into the formula. The 'Key Pad' tab is used to enter number, parenthesis and arithmetic operators into the formula. FIG. 22. The 'Comparator' tab is used to enter a comparator into a logic statement. FIG. 23. The 'Value' tab is used to enter a number into the logic statement. FIG. 24.

Once the flowchart is constructed and its logic implemented, the next step is to use it to filter records. There are two variations to this scheme. The first variation has a broader scope in terms of its applicability because it applies in all circumstances. The second variation has a more limited scope because it does not apply to flowchart that contains formula logic unit node[2]. The first variation uses a flowchart as an alternative mechanism to the 'WHERE' clause of a SQL SELECT statement. In this variation, the scheme is to select all the records from the database and run each record against the flowchart to determine whether the record should be selected. The second variation is to construct the 'WHERE' clause of a SQL SELECT statement using the flowchart algorithm and append the 'WHERE' clause to the SQL SELECT statement and performs the appended SQL SELECT statement against the database. In both variations, there are no restrictions in the size and complexity of the flowchart (as long as it is logically consistent), hence there are no restriction in the sophistication of the filtering algorithms.

The first variation is to retrieve all the records from the database[3] and then run each record against the flowchart to determine if it should be filtered in. The algorithm begins from the start unit. If the next node is a field logic unit node or a formula logic unit node, the logic statement of the node will be executed to determine if that path of the algorithm flows out from the true or the false output port of the node. Specifically if the node is a field logic unit node, the comparison is made between the field value of the logic statement of the logic unit node with respect to the record against the constant of the logic statement of the field logic unit node. Similarly if the node is a formula logic unit node, the comparison is made between the evaluated value of the formula of the logic statement of the formula logic unit node with respect to the record against the constant of the logic statement of the formula logic unit node. If the path of the algorithm arrives at an end unit, this means the particular record should be selected.

The second variation is to generate a SQL statement based on the flowchart constructed. This variation only applies to flowchart that does not contain formula logic unit node. The overall scheme is to recognize that as the algorithm propagates from the start unit of the flowchart towards the end units of the flowchart, it will recursively trace out paths to the end units. Each path therefore represents a combination of conditions that is a product of a multitude of AND and NOT AND logic, depending on whether that segment of the path is originated from a true output port or a false output port. If there is more than one path that reaches an end unit, it means there is more than one way (that is, combination of conditions) the end unit can be arrived. Hence the last step is to logically OR all the cumulative conditions represented by each path. The result is a conditional statement that can be used to append to the SQL SELECT statement to run against a database. See Appendix A. This conditional statement can be factorized for optimization.

Figure 3:
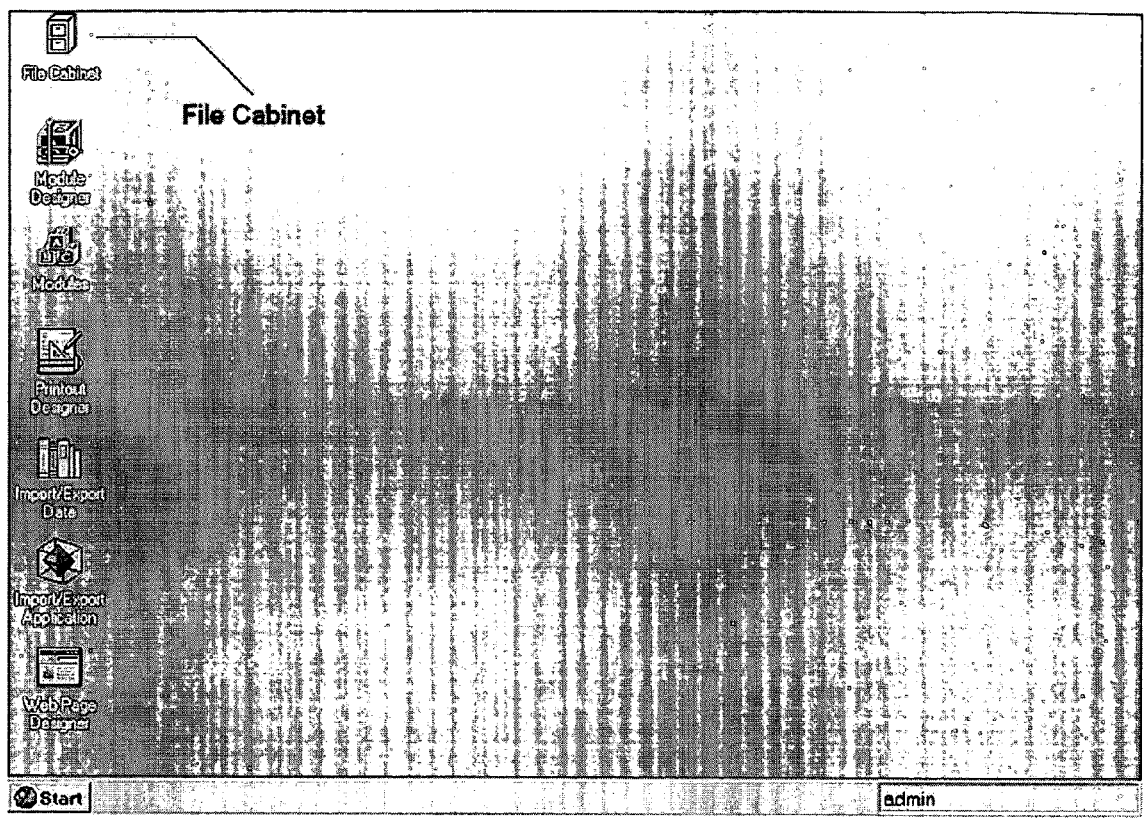
FIG. 3 is a screen shot of background interface of the framework. The first icon shows a 'File Cabinet', which is the access point to a file cabinet metaphor of the framework.
Figure 4:
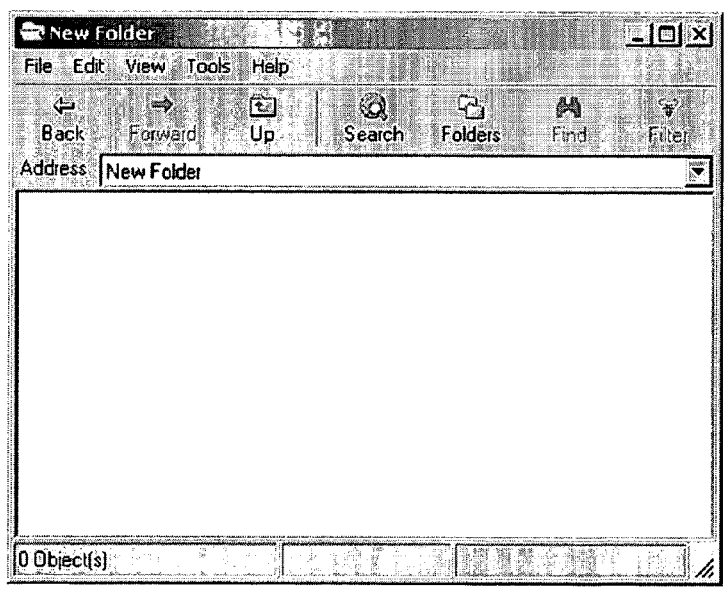
FIG. 4 is a screen shot of a window of a new folder of a framework.
Figure 25:
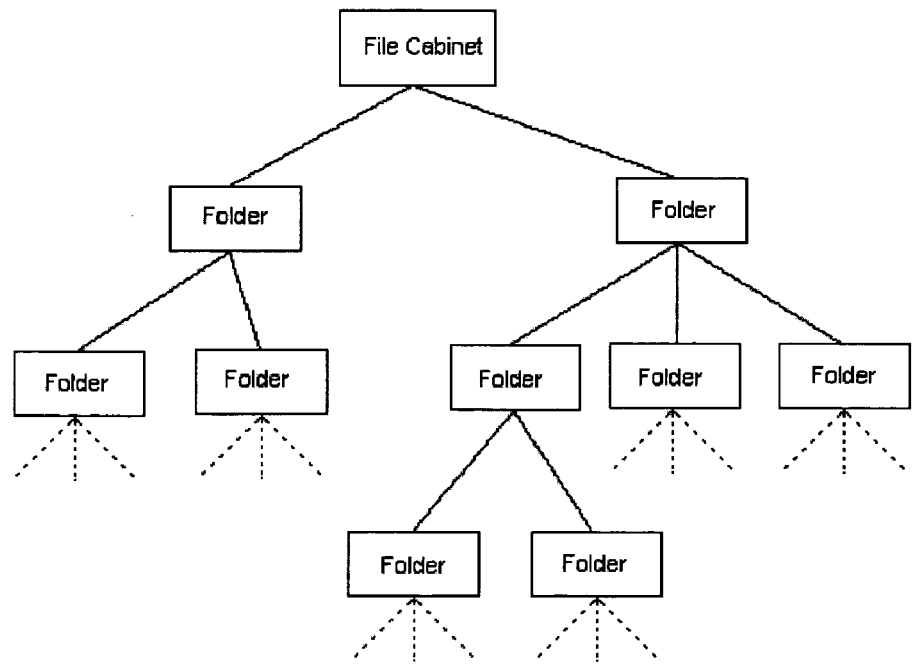
FIG. 25 is a diagram illustrating the hierarchical structure of the file cabinet of the framework.
Figure 26:
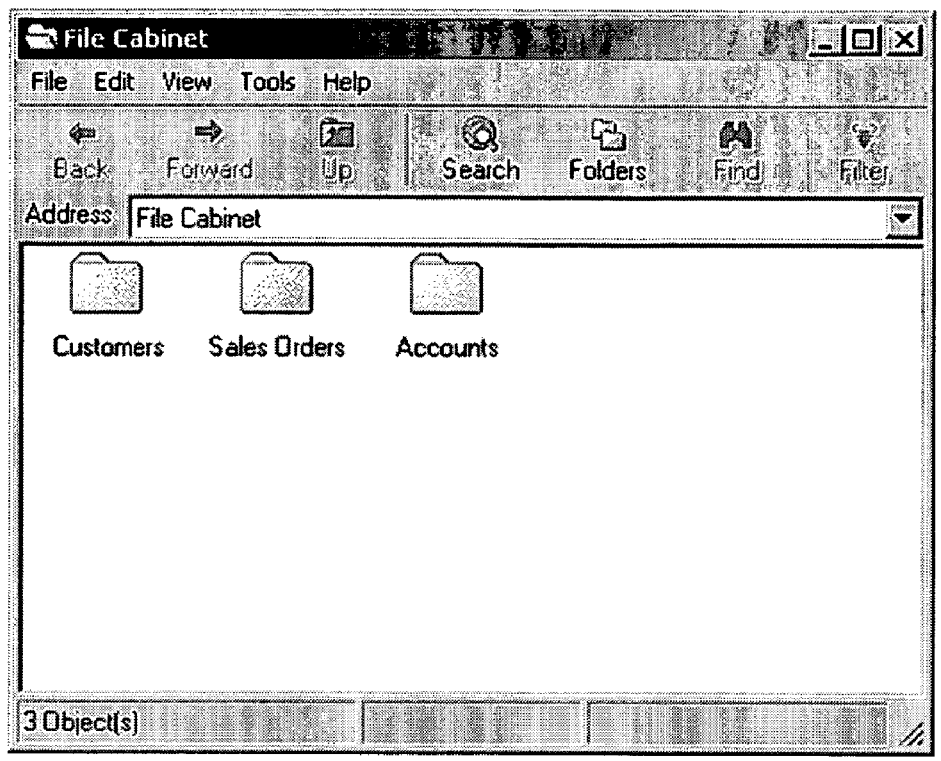
FIG. 26 is a screen shot of a window illustrating the contents of the file cabinet of the framework.

The File Cabinet shown in FIG. 3 is a place where data is organized and presented. The file cabinet can contain any number of folders where each folder can in turn contain any number of folders. Hence it has the structure of a tree with the root of the tree being the File Cabinet as shown in FIG. 25. Double click on the File Cabinet icon will open a new window that represents the content in the first hierarchy of the file cabinet. The types of items that the first hierarchy of the file cabinet can hold are folders as shown in FIG. 26. Double click on these folders will open another window that represents the content in the clicked folder (the second hierarchy of the file cabinet). In a folder, two types of object can be presented. The first are folders, the second are module instances (sometimes refer to as files or business objects). As a user recursively double click and open the folders, the user will traverse the tree structure to a higher hierarchy until there are no more folders in the folder.

Figure 27:
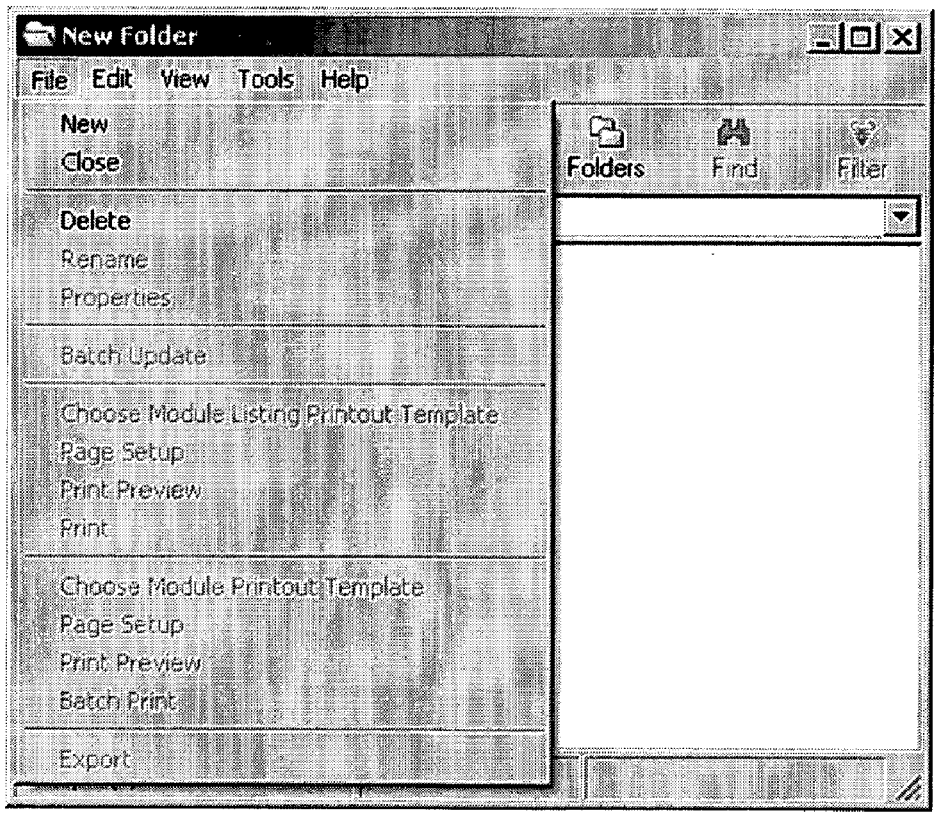
FIG. 27 is a screen shot of a new folder window after the file menu has been clicked-on of the framework.

FIG. 27 shows a new folder is added by clicking on the 'File' menu and then clicking on the 'New' sub menu. When a new folder is added, its default content setting is 'Contains only user added Folders', meaning the only items that can exist in the new folder are folders that were added by a user.

Figure 28:
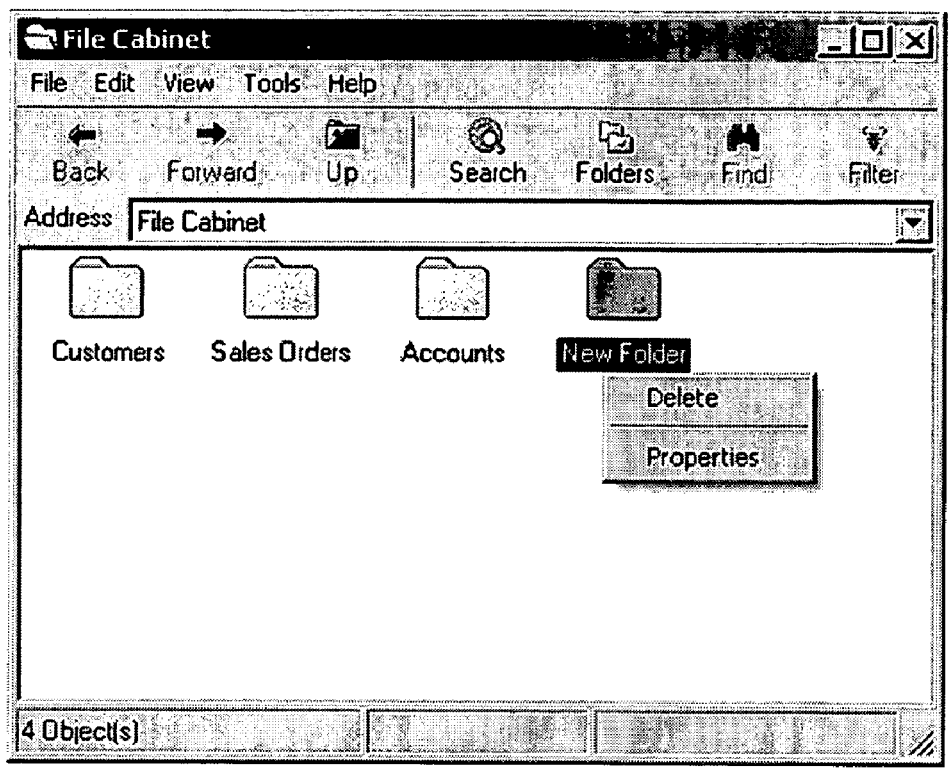
FIG. 28 is a screen shot of a window of a file cabinet after a new folder has been highlighted, showing the delete, properties menu.
Figure 29:
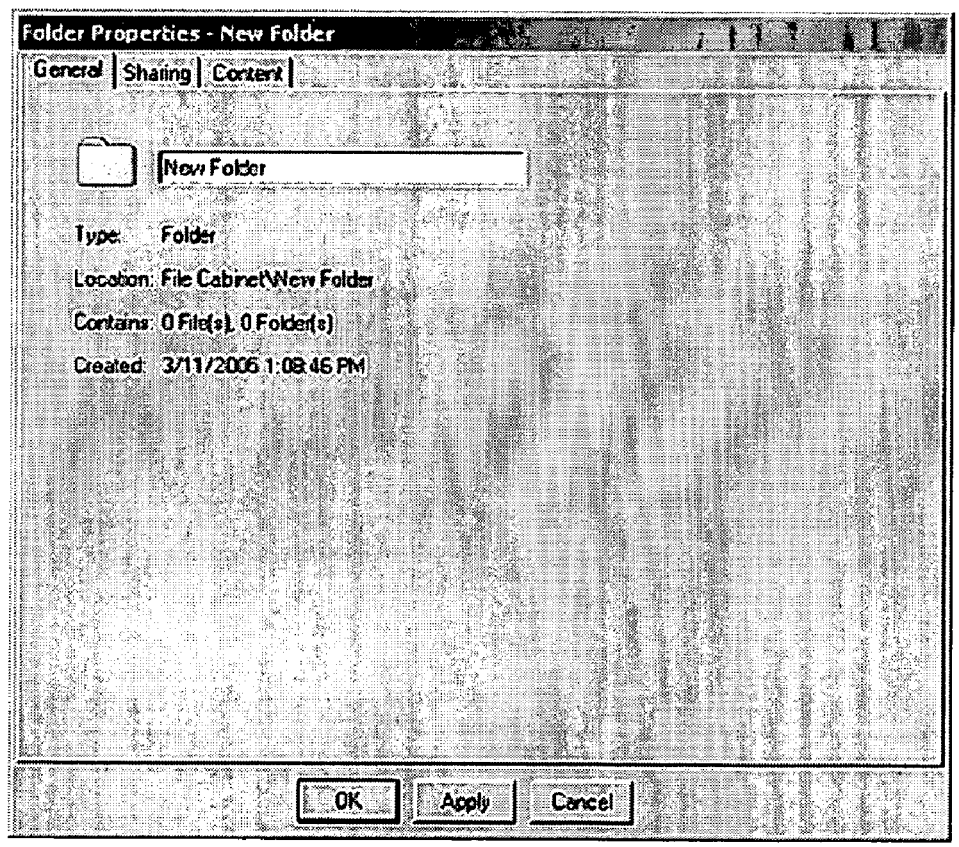
FIG. 29 is a screen shot of a folder properties window after the properties menu of a folder has been clicked in FIG. 28.
Figure 30:
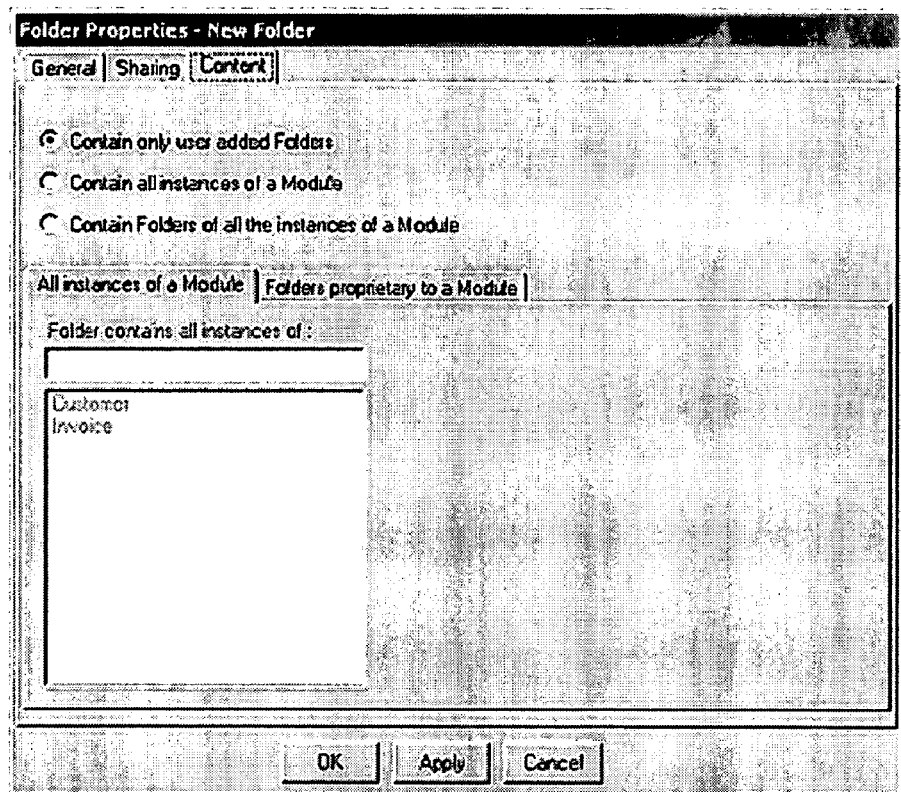
FIG. 30 is a screen shot of a folder properties window showing the content tab and the All instances of a module tab after the properties menu of a folder has been clicked in FIG. 28.

The other items a folder can hold besides folder are module instances. Module instances are the application data saved in a database of a module. For example, if the module is an invoice module, the invoice module instance is the data of a particular invoice saved in a database. Module instances are sometimes referred to as files or business objects. To configure a folder to hold other items, right click on the folder to bring up the Properties menu as shown in FIG. 28. Click on the 'Properties' menu to bring up the Folder Properties window as shown in FIG. 29. There are three tabs in the Folder Properties window. They are 'General', 'Sharing' and 'Content'. The content of the folder are configured in the 'Content' tab as shown in FIG. 30.

Figure 31:
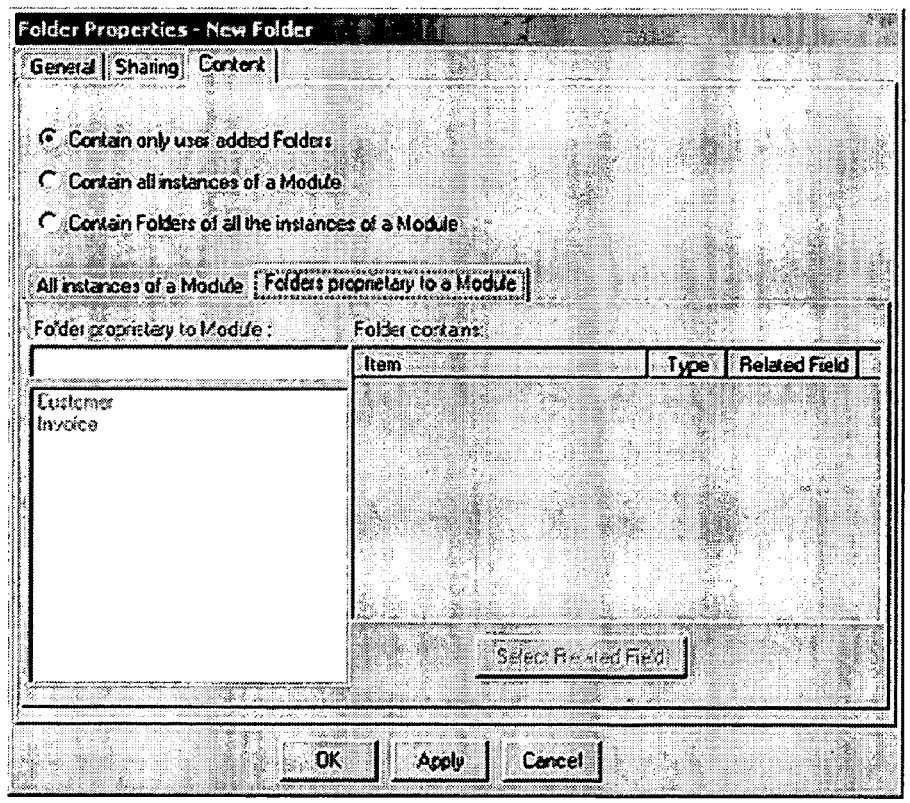
FIG. 31 is a screen shot of a folder properties window showing the content tab and the Folder proprietary to a Module tab after the properties menu of a folder has been clicked in FIG. 28.

The 'Content' tab consists of three radiobuttons and two tabs. The radiobuttons are 'Contain only user added Folders', 'Contain all instance of a Module' and 'Contain Folders of all the instances of a Module'. The two tabs are 'All instances of a Module' and 'Folders proprietary to a Module', as shown in FIG. 31. When a folder is newly added, the default setting is 'Contains only user added Folders'. The following are the description of each setting:

Contain only user defined Folders: This is the default setting when a folder is newly added. In this setting, the content of the folder can only be folders that are added by a user, via the File>> New menu as shown in FIG. 27.

Figure 32:
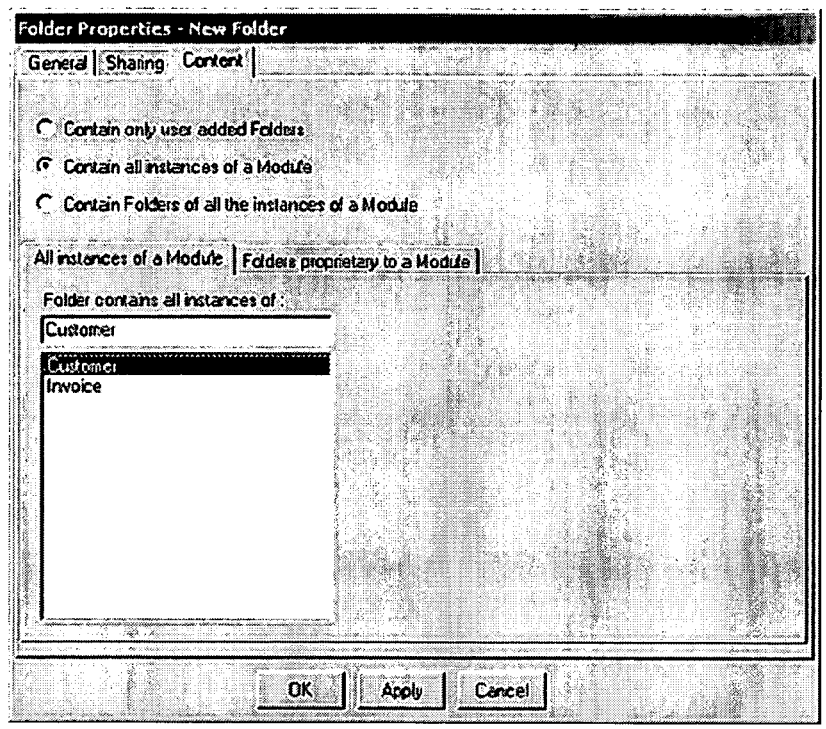
FIG. 32 is a screen shot of a folder properties window showing the content tab and the 'All instances of a Module' tab with the Contain all instances of a Module checked and the customer module selected.

Contain all instances of a Module: In this setting, the folder will contain all the instances of a particular module. For example, if the particular module is an invoice, then the folder will contain all the invoice instances of the application (For example, invoice 1000, 1001, 1002 . . . etc). When this setting is chosen, the listbox containing all the modules in the application on the 'All instances of a Module' tab will be enabled, allowing a user to select a module as shown in FIG. 32.

Figure 33:
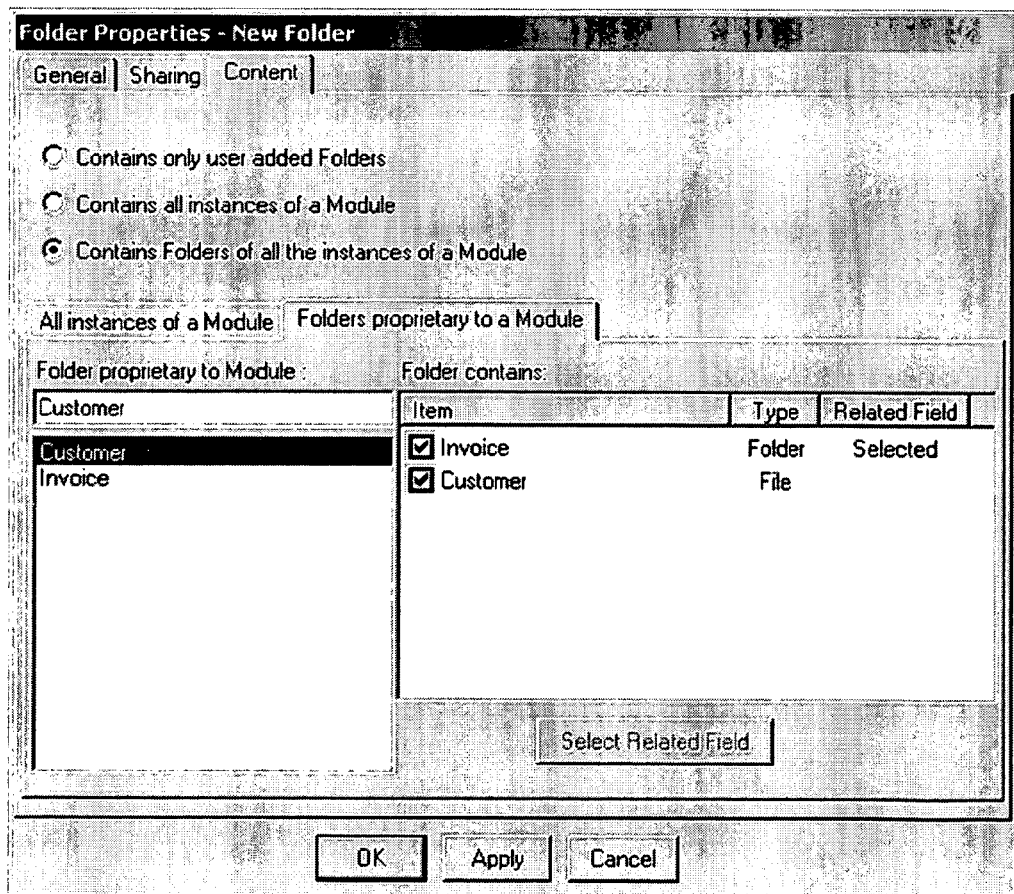
FIG. 33 is a screen shot of a folder properties window showing the Content tab and the Folders proprietary to a Module tab, with the customer module selected and the invoice folder selected and the customer file selected.
Figure 34:
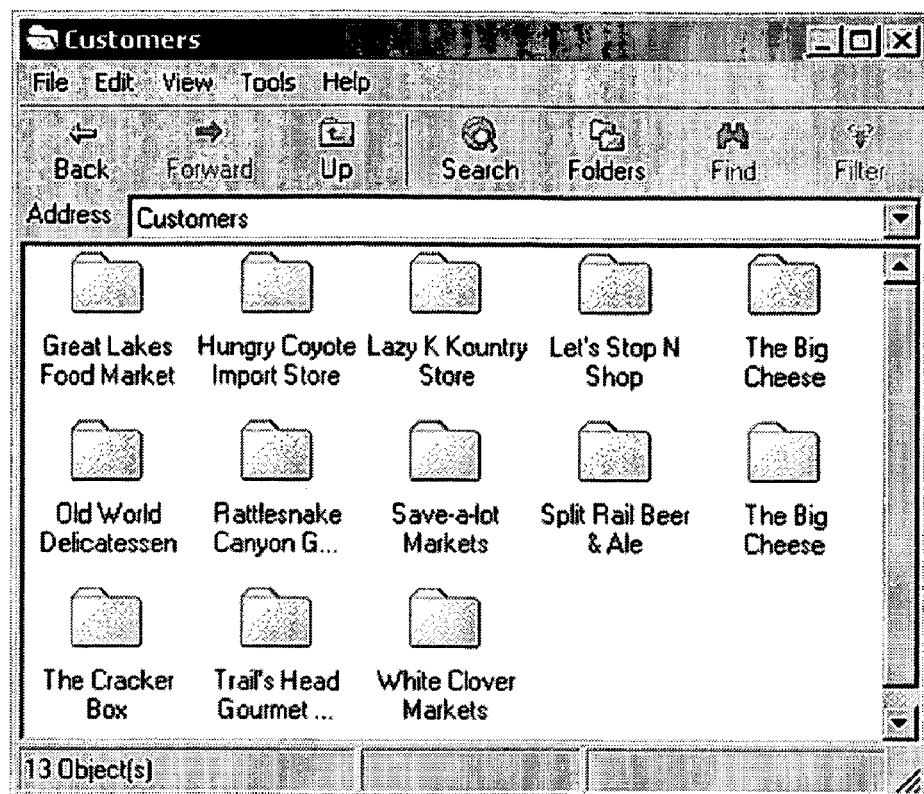
FIG. 34 is a screen shot of the content of a customers' folder showing a plurality of folders, one for each customer
Figure 35:
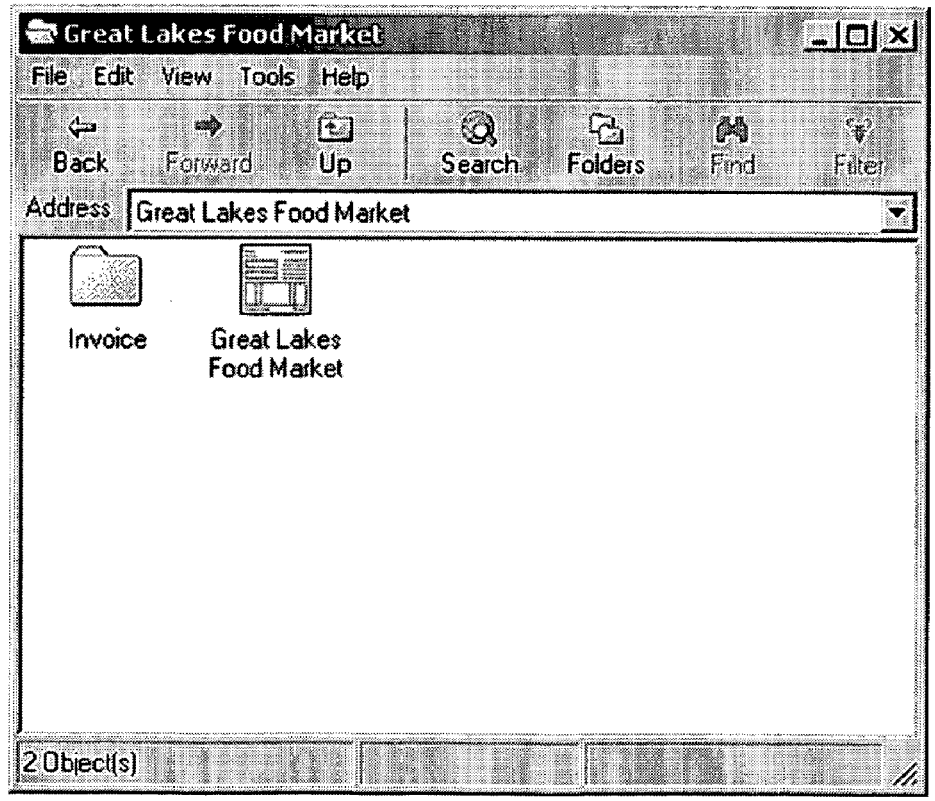
FIG. 35 is a screen shot showing the content of one of the customer folder in FIG. 34. In it, there is an invoice folder containing all the invoices of the customer (in this case, it is Great Lakes Food Market) and a file of the customer.

Contain Folders of all the instances of a Module: In this setting, the folder will contain a folder for each instance of a selected module. These folders in turn will contain all the folders pertaining to the selected modules and an instance of the proprietary module, if selected, in the 'Folders proprietary to a Module' tab of the Folder Properties Content tab, as shown in FIG. 33. This is best illustrated by an example. For instance, if the module selected to be proprietary to the folder is a Customer module (FIG. 33), then the folder will contain a folder for each and every customer as shown in FIG. 34. When a folder of a particular customer is opened, the content will be the item(s) selected in the right listbox of the 'Folders proprietary to a Module' tab, as shown in FIG. 33. In this case, the Invoice folder and the Customer file are selected. Hence this folder will contain a folder that contains all the invoices of this customer and a file (that is, module instance) of this customer, as shown in FIG. 35.

Figure 36:
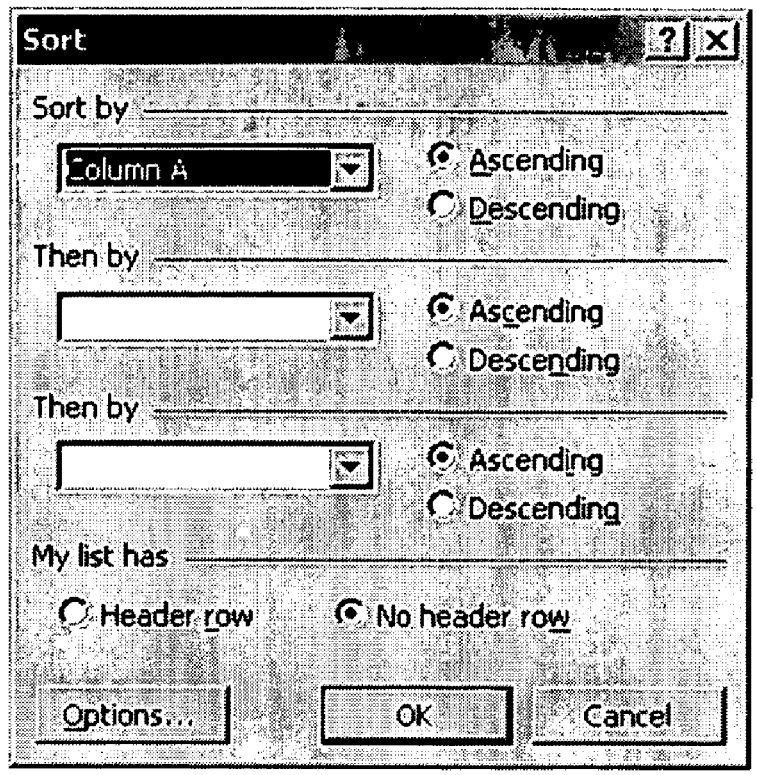
FIG. 36 is a screen shot of a Microsoft Excel Sort dialog box.
Figure 37:
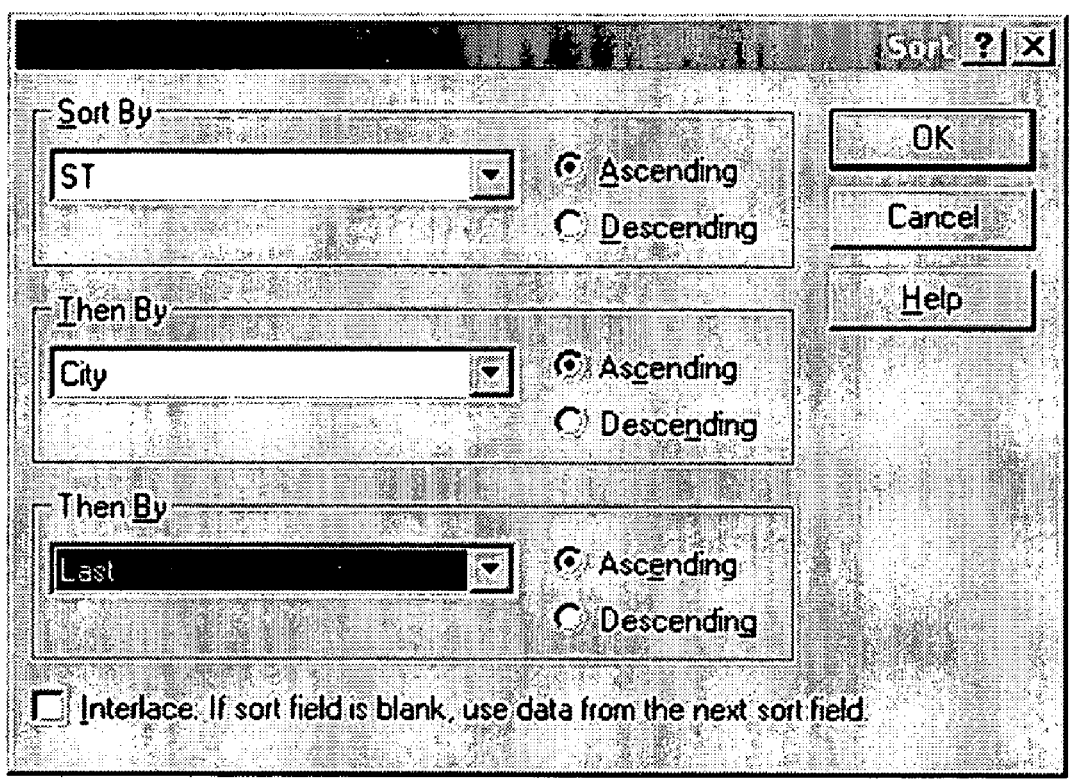
FIG. 37 is a screen shot of a MyMailList Sort dialog box.

This framework also provides a more flexible sorting procedure. Sorting is the reordering of records (sometime referred to as module instances, files or business objects) with respective to a field (sometime referred to as property) of the records in an ascending or descending manner. Since the list of records can have duplicated field value of the field to sort, hence many of the existing database applications have provisions to further refine the sort by allowing a user to successively sort the fields that have not been sorted within the order of the records that have been sorted. For example, a list of United States address that are sorted in an ascending order with respect to the state (from Alabama to Wyoming) will likely have more than one record in each state and further refining the sort will probably involves the sorting of the name of the city within each state and address within each city and so on. However, the scheme offered by existing database application has limitation in that the maximum number of successive sort allowed are restricted. This means that further refinement in the sorting is impossible if the records have more fields than the maximum number of successive sort allowed and there are duplicated field values of the field beyond fields that have been sorted. (For example, considering a list of United States residential addresses, if a database application sorting procedure allows only three successive sorts, then no further sorting is possible after a user sorts the state, city and the last name of the resident, even if there are more that one resident in a city bearing the same last name.) Using Microsoft Excel spreadsheet as an example, the maximum number of successive sorts is three as shown in FIG. 36. Similarly, other program such as MyMailList has the same limitation as shown in FIG. 37.

Figures 38, 39:
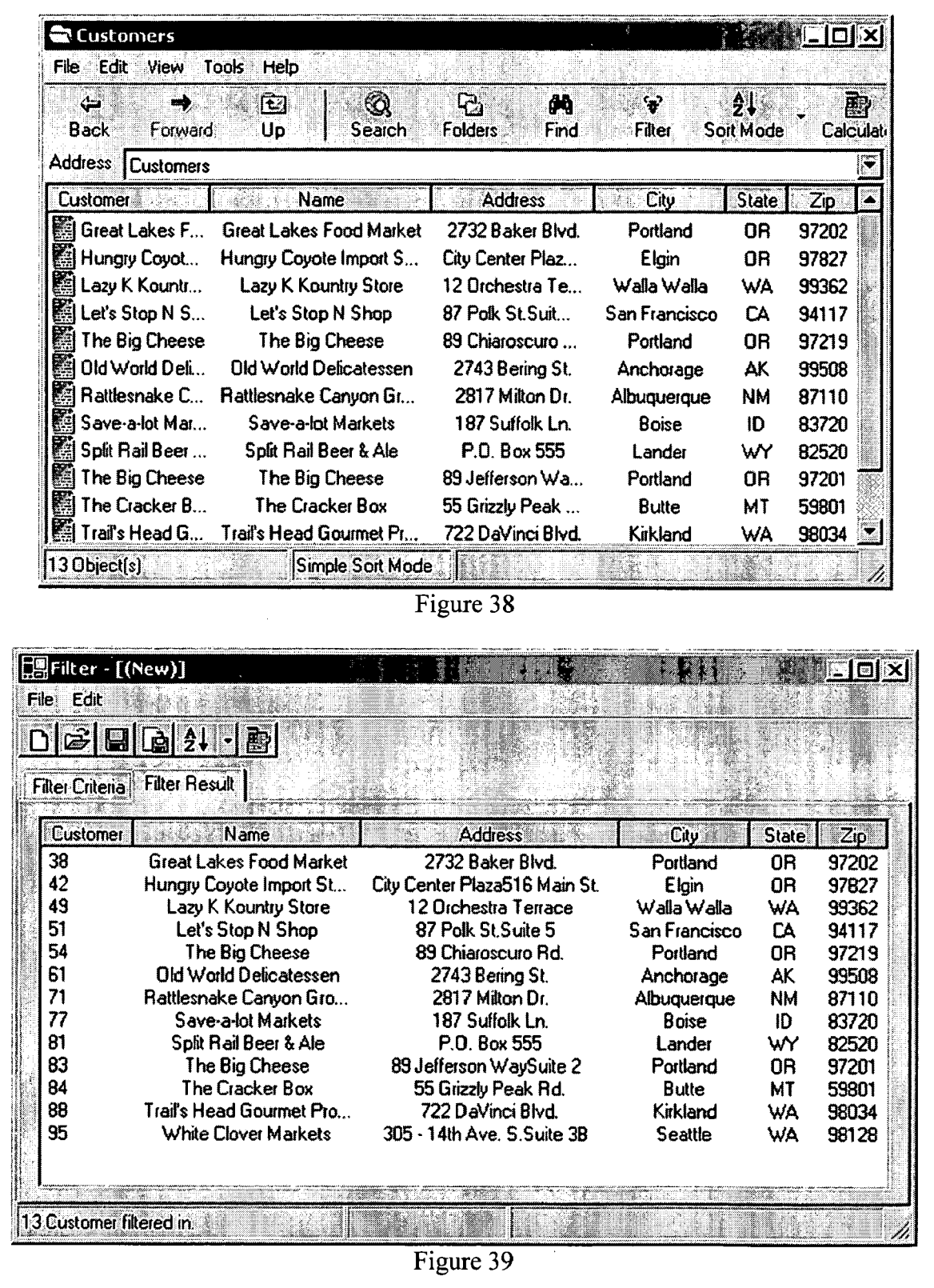

This framework has no restriction on the maximum number of successive sort allowed so that all the fields (this means number, text, date and Boolean field) created by a user in an application using this framework can be successively sorted. The folder and the filter in this framework provide the interface for sorting the records, as shown in FIG. 38 and FIG. 39. There are two modes of sorting in the framework. They are simple sort and complex sort. In simple sort mode, each sort is independent of each other. In other words, there is no memory of the sort history between each sort. Simple sort is the standard sorting procedure found in many existing database applications. In complex sort mode, each sort is built on the previous sort. Specifically each successive sort will refine the previous sort by retaining the previous sort order of the field(s), while sorting the current field. That is, the current sort will sort within the order of the previous sort.

Figures 40, 41:
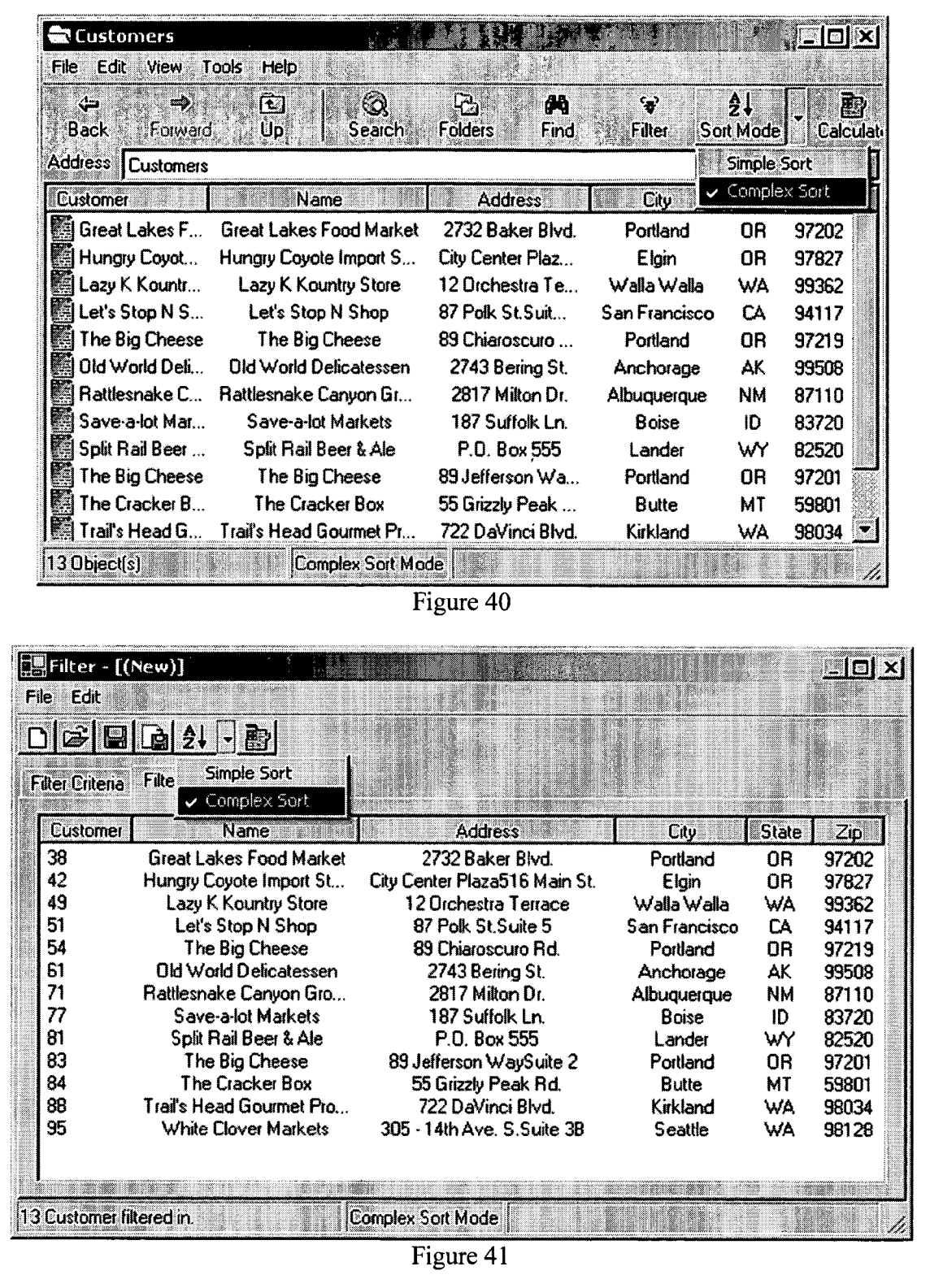

To perform complex sort on a list of records, check the complex sort menu to put into complex sort mode as shown in FIG. 40 and FIG. 41. Then click on the header of the field you want to sort. Each successive click will sort the current clicked field within the order of the previous sorted field. This process can be repeated until all the fields are sorted. FIG. 42 to FIG. 45 shows a list of United States address being successively sorted, illustrating the sort are progressively refined at each stage of the sort.

APPENDIX A

This shows how a flowchart generate the 'WHERE' clause of an SQL SELECT statement.

FIG. 46 is a flowchart where A, B, C, D, E and F are Boolean statement that can be evaluated to true or false. For example, A can be Unit Price >$2.00, B can be State is equal to "Vermont" . . . etc.

FIG. 47 shows Path 1 (the gray strip). Its logic is A AND C AND E

FIG. 48 shows Path 2 (the gray strip). Its logic is A AND C AND NOT E AND NOT F

FIG. 49 shows Path 3 (the gray strip). Its logic is A AND NOT C AND D

FIG. 50 shows Path 4 (the gray strip). Its logic is NOT A AND NOT B

Hence the resultant logic is to logically OR all the condition of each path:

(A AND C AND E) OR (A AND C AND NOT E AND NOT F) OR (A AND NOT C AND D) OR (NOT a AND NOT B)

This resultant logic forms the WHERE clause of a SQL SELECT statement and hence can be appended to it. If the name of the database table is TABLE1 and you want to select a field called Field1 in the table, the SQL SELECT statement is:

SELECT Field1 FROM TABLE1 WHERE (A AND C AND E) OR (A AND C AND NOT E AND NOT F) OR (A AND NOT C AND D) OR (NOT A AND NOT B)

GLOSSARY

Module—a functional unit of an application that creates a business object. A module usually has an interface that interacts with a user for data input and presentation. For example, in an accounting application, there will likely be a customer module, an invoice module, an account module, a general journal module . . . etc.

Module instance—a particular object created by its corresponding module. For example, a module instance of an invoice module is a particular invoice, such as, invoice 1001. A module instance of an employee module is a particular employee, such as, employee Sam.

Business object—an item that encapsulates all the attributes and functionalities of a business entity in an application, such as a customer, an employee, an invoice . . . etc. Business object is often used interchangeably with module instance.

File—a module instance. This term is usually used when referring a module instance in a folder.

Record—an entry in a database table. A record contains wholly or partly the data that manifest itself as a module instance when the record data is loaded from a database. In other words, the data of a module instance (sometimes refers to as business object, file) is stored in a database as entries in one or more related database table.

Textbox—a standard windows control used for inputting and displaying text

Combobox—a standard windows control that resembles a textbox but with a button on the right that when click, presents a presents a list of selections for a user to select from Listbox—a standard windows control that presents a list of selections for a user to select from Listview—a standard windows control that presents a list of selection together with its properties for a user to select from Radiobutton—a standard windows controls that are used in conjunction with other radiobuttons allowing a user to exclusively select an option.

NOTES

1—The programming code involves the use of recursive routine.

2—This is due to the limitation of the SQL query.

3—This involves the use of the SQL SELECT statement without the WHERE clause.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A computer-implemented method for querying records from a database in a SQL database server wherein the query is provided as a flowchart, the flowchart including:
   a start unit at which the flowchart starts;
   one or more value units at which the flowchart ends,
   one or more logic units between the start unit and the value unit, each logic unit:
      representing a logic statement,
      having a true output representing a true result of the logic statement, and
      having a false output representing a false result of the logic statement, and
   possible paths through the flowchart wherein each path extends:
      from the start unit,
      into one or more of the logic units,
      out of one of the true output and the false output of each logic unit that the path enters, and
      ending at one of the value units,
   the method including the steps of:
   a. determining all possible paths through the flowchart;
   for each possible path, generating a path logic statement including:
      the logic statement of the first logic unit along the path after the start unit, and
      the logic statement of each successive logic unit along the path, wherein the logic statement of each successive logic unit is appended to the path logic statement by:
         an AND if the successive logic unit is entered from a true output of the prior logic unit along the path, or
         an AND NOT if the successive logic unit is entered from a false output of the prior logic unit along the path;

generating a flowchart logic statement including all path logic statements, wherein each path logic statement is separated from any adjacent path logic statements by a logical OR.

2. The method of claim 1 further including the steps of:
evaluating all records versus the flowchart logic statement, and
returning all records satisfying the flowchart logic statement.

3. The method of claim 1 further including the steps of generating an SQL SELECT statement in the form of SELECT Field FROM Table WHERE Condition wherein:
Table is a desired table from the database;
Field is one or more desired fields for selection from the desired table; and
Condition is the flowchart logic statement.

4. The method of claim 3 further including the step of:
submitting the SQL SELECT statement to an SQL engine; and
presenting all records returned by the SQL engine.

5. The method of claim 1 further including the step of generating the flowchart, wherein this step includes the substeps of:
defining the start unit, the start unit being graphically represented by a box;
defining the one or more logic units, wherein
each such definition includes the logic statement represented by the logic unit, and
each logic unit is graphically represented by a box having an appearance different from the start unit box;
defining the one or more value units, wherein each value unit is graphically represented by a box having an appearance different from the boxes of the start unit and the one or more logic units.

6. The method of claim 5 further including the substep of defining the paths, the paths being graphically represented by lines, wherein each line extends between two of the units.

7. The method of claim 1 further including the step of generating the flowchart, wherein this step includes the substep of defining the one or more logic units, wherein each such definition includes the logic statement represented by the logic unit, with the logic statement including:
a constant;
a comparator; and
one of:
a field within the database, and
a formula defining a mathematical operation to be performed on a field within the database.

8. A computer-implemented method for querying records from a database in a SQL database server wherein the query is provided as a flowchart, the flowchart including:
a start unit at which the flowchart starts;
one or more value units at which the flowchart ends,
one or more logic units between the start unit and the value unit, each logic unit:
representing a logic statement,
having a true output representing a true result of the logic statement, and
having a false output representing a false result of the logic statement, and
paths through the flowchart wherein each path extends:
from the start unit,
into one or more of the logic units,
out of one of the true output and the false output of any logic unit that the path enters, and
ending at one of the value units,
the method including the steps of:
selecting one or more of the value units;
determining all paths through the flowchart which end at the selected value units;
for each path ending at the selected value units, generating a path logic statement including:
the logic statement of the first logic unit along the path after the start unit, and
the logic statement of each successive logic unit along the path, wherein the logic statement of each successive logic unit is appended to the path logic statement by:
a logical AND if the successive logic unit is entered from a true output of the prior logic unit along the path, or
a logical AND NOT if the successive logic unit is entered from a false output of the prior logic unit along the path;
generating a flowchart logic statement including all generated path logic statements, wherein each path logic statement is separated from any adjacent path logic statements by a logical OR.

9. The method of claim 8 further including the steps of:
evaluating at least some of the records in the database versus the flowchart logic statement, and
returning all records satisfying the flowchart logic statement.

10. The method of claim 8 further including the steps of generating an SQL SELECT statement in the form of SELECT Field FROM Table WHERE Condition wherein:
Table is a desired table from the database;
Field is one or more desired fields for selection from the desired table; and
Condition is the flowchart logic statement.

11. The method of claim 10 further including the step of:
a. submitting the SQL SELECT statement to an SQL engine; and
b. presenting all records returned by the SQL engine.

12. The method of claim 8 further including the step of generating the flowchart, wherein this step includes the substeps of:
a defining the start unit, the start unit being graphically represented by a box;
defining the one or more logic units, wherein
each such definition includes the logic statement represented by the logic unit, and
each logic unit is graphically represented by a box having an appearance different from the start unit box;
defining the one or more value units, wherein each value unit is graphically represented by a box having an appearance different from the boxes of the start unit and the one or more logic units.

13. The method of claim 12 further including the substep of defining the paths, the paths being graphically represented by lines, wherein each line extends between two of the units.

14. The method of claim 8 further including the step of generating the flowchart, wherein this step includes the substep of defining the one or more logic units, wherein each such definition includes the logic statement represented by the logic unit, with the logic statement including:
a constant;
a comparator; and
one of:
a field within the database, and
a formula defining an operation to be performed on a field within the database.

15. A computer-implemented method for realizing conditions of a database application in a SQL database server, the database application being provided as a flowchart including:
   a start unit at which the flowchart starts;
   one or more value units at which the flowchart ends, each value unit defining a condition;
   one or more logic units between the start unit and the value unit, each logic unit:
      representing a logic statement,
      having a true output representing a true condition of the logic statement, and
      having a false output representing a false condition of the logic statement, and
   paths through the flowchart wherein each path extends:
      from the start unit,
      into one or more of the logic units,
      out of one of the true output and the false output of any logic unit that the path enters, and
      ending at one of the value units,
the method including the steps of:
   obtaining an input;
   determining all paths through the flowchart;
   generating a path logic statement for each path through the flowchart, each path logic statement including:
      the logic statement of the first logic unit along the path after the start unit, and
      the logic statement of each successive logic unit along the path, wherein the logic statement of each successive logic unit is appended to the path logic statement by:
         a logical AND if the successive logic unit is entered from a true output of the prior logic unit along the path, or
         a logical AND NOT if the successive logic unit is entered from a false output of the prior logic unit along the path;
   evaluating the input versus each path logic statement, thereby determining one or more value units resulting from the input; and
   returning the conditions of the resulting value units.

16. The method of claim 15 wherein the condition defined by each value unit defines:
   a value, or
   an action to be taken.

17. The method of claim 15 wherein the logic statement of each logic unit includes:
   a comparator; and
   at least one of:
      a constant, and
      a formula defining a mathematical operation to be performed on the input.

18. The method of claim 15 further including the step of generating the flowchart, wherein this step includes the substeps of:
   defining the start unit, the start unit being graphically represented by a box;
   defining the one or more logic units, wherein
      each such definition includes the logic statement represented by the logic unit, and
      each logic unit is graphically represented by a box having an appearance different from the start unit box;
   defining the one or more value units, wherein
      each such definition includes the condition defined by the value unit, and
      each value unit is graphically represented by a box having an appearance different from the boxes of the start unit and the one or more logic units.

19. The method of claim 18 further including the substep of defining the paths, the paths being graphically represented by lines, wherein each line extends between two of the units.

* * * * *